United States Patent
Chang et al.

(10) Patent No.: US 10,659,968 B2
(45) Date of Patent: May 19, 2020

(54) METHOD FOR PERFORMING COMMUNICATION BY USING UNLICENSED SPECTRUM, DEVICE, AND SYSTEM

(71) Applicant: HUAWEI TECHNOLOGIES CO., LTD., Shenzhen (CN)

(72) Inventors: Junren Chang, Beijing (CN); Li Chai, Beijing (CN); Jie Ma, Beijing (CN); Yajuan Li, Beijing (CN); Bo Lin, Beijing (CN); Shulan Feng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 171 days.

(21) Appl. No.: 15/248,430

(22) Filed: Aug. 26, 2016

(65) Prior Publication Data
US 2016/0366594 A1 Dec. 15, 2016

Related U.S. Application Data

(63) Continuation of application No. PCT/CN2014/072752, filed on Feb. 28, 2014.

(51) Int. Cl.
*H04W 4/00* (2018.01)
*H04W 16/14* (2009.01)
(Continued)

(52) U.S. Cl.
CPC ........... *H04W 16/14* (2013.01); *H04L 5/0048* (2013.01); *H04L 5/14* (2013.01); *H04W 72/1289* (2013.01);
(Continued)

(58) Field of Classification Search
CPC ..... H04W 88/08; H04W 48/12; H04W 72/04; H04W 84/12; H04W 40/04; H04L 5/0094
(Continued)

(56) References Cited

U.S. PATENT DOCUMENTS

2011/0105069 A1* 5/2011 Gaal ..................... H04W 76/28
455/226.1
2013/0165134 A1* 6/2013 Touag ............... H04W 72/0486
455/452.1
(Continued)

FOREIGN PATENT DOCUMENTS

CN 101043709 A 9/2007
CN 102104961 A 6/2011
(Continued)

OTHER PUBLICATIONS

International Search Report dated Dec. 3, 2014 in corresponding International Application No. PCT/CN2014/072752.
(Continued)

*Primary Examiner* — Zewdu A Beyen
(74) *Attorney, Agent, or Firm* — Maier & Maier, PLLC

(57) ABSTRACT

Embodiments of the present invention disclose a method for performing communication by using an unlicensed spectrum, a device, and a system, which relate to the field of communications technologies, so as to improve efficiency of using an unlicensed spectrum by user equipment. The method includes: obtaining, by a base station eNB, a time resource and/or a frequency resource by contending with another eNB or another system using an unlicensed spectrum; generating, by the base station eNB, information about the time resource and/or the frequency resource according to the time resource and/or the frequency resource; and sending, by the base station eNB, the information about the time resource and/or the frequency resource to user equipment UE by using a broadcast or multicast message, so that the user equipment UE communicates with the base station eNB according to the information about the time resource and/or the frequency resource.

9 Claims, 5 Drawing Sheets

(51) Int. Cl.
*H04W 76/28* (2018.01)
*H04L 5/00* (2006.01)
*H04L 5/14* (2006.01)
*H04W 72/12* (2009.01)
*H04W 72/04* (2009.01)
*H04L 12/18* (2006.01)

(52) U.S. Cl.
CPC .......... *H04W 76/28* (2018.02); *H04L 12/189* (2013.01); *H04W 72/04* (2013.01)

(58) Field of Classification Search
USPC .......... 370/252, 393, 330, 331, 338
See application file for complete search history.

(56) References Cited

U.S. PATENT DOCUMENTS

| | | |
|---|---|---|
| 2014/0003387 A1 | 1/2014 | Lee et al. |
| 2015/0131536 A1 | 5/2015 | Kaur et al. |
| 2015/0215989 A1* | 7/2015 | Bangolae ............ H04L 65/1006 370/311 |
| 2016/0066322 A1 | 3/2016 | Bontu et al. |

FOREIGN PATENT DOCUMENTS

| | | |
|---|---|---|
| CN | 102158294 A | 8/2011 |
| CN | 102333381 A | 1/2012 |
| CN | 103428708 A | 12/2013 |
| CN | 103580840 A | 2/2014 |
| KR | 1020140010385 | 1/2014 |
| KR | 1020140017517 | 2/2014 |
| WO | 2012/078565 A1 | 6/2012 |

OTHER PUBLICATIONS

Japanese Office Action dated Jan. 9, 2018 in corresponding Japanese Patent Application No. 2016-554418, 5 pp.
International Search Report and Written Opinion dated Dec. 3, 2014 in corresponding International Patent Application No. PCT/CN2014/072752.
Hei, Chunxia et al., *A Design Scheme of Cognitive LTE-A Radio Network,* 2013 5th IEEE International Symposium on Microwave, Antenna, Propagation and EMC Technologies for Wireless Communications, IEEE, Oct. 29, 2013, XP032536073, pp. 65-70.
Extended European Search Report, dated Mar. 29, 2018, in European Application No. 14884017.6 (6 pp.).
Chinese Office Action for Chinese Application No. 201480000314.X dated Sep. 29, 2018.
Notice of Preliminary Rejection, dated Apr. 13, 2018, in Korean Application No. 1020167026221 (12 pp.).

* cited by examiner

METHOD FOR PERFORMING COMMUNICATION BY USING UNLICENSED SPECTRUM, DEVICE, AND SYSTEM

CROSS-REFERENCE TO RELATED APPLICATION

This application is a continuation of International Application No. PCT/CN2014/072752, filed on Feb. 28, 2014, which is incorporated herein by reference in its entirety.

TECHNICAL FIELD

The present invention relates to the field of communications technologies, and in particular, to a method for performing communication by using an unlicensed spectrum, a device, and a system.

BACKGROUND

During spectrum management of an existing Long Term Evolution LTE (Long Term Evolution) system, spectrum management is a spectrum planning method established for the purpose of effectively using a radio frequency. Existing spectrum management involves a licensed spectrum and an unlicensed spectrum. The licensed spectrum is a spectrum licensed for a mobile operator or a mobile technology (such as UMTS/LTE) to use. The unlicensed spectrum is an unlicensed frequency resource spectrum that can be shared between different wireless devices on a basis of the licensed spectrum, for example, WiFi.

Currently, because frequency band utilization of the unlicensed spectrum is relatively low, and a user has increasing requirements for a mobile broadband, the mobile operator needs more spectrum resources to meet the requirements of the user, so as to rectify a current situation in which the licensed spectrum currently cannot fully meet a communication service requirement of the user. However, because utilization of the unlicensed spectrum is low, use of the unlicensed spectrum is impeded, and user equipment cannot efficiently use the unlicensed spectrum.

SUMMARY

Embodiments of the present invention provide a method for performing communication by using an unlicensed spectrum, a device, and a system, so as to improve efficiency of using an unlicensed spectrum by user equipment.

To achieve the foregoing objective, the following technical solutions are used in the embodiments of the present invention:

According to a first aspect, a base station is provided, including:

a contention unit, configured to obtain a time resource and/or a frequency resource by contending with another eNB or another system using an unlicensed spectrum;

a generation unit, configured to generate information about the time resource and/or the frequency resource according to the time resource and/or the frequency resource obtained by contention by the contention unit; and a sending unit, configured to send the information that is about the time resource and/or the frequency resource and is generated by the generation unit to user equipment UE by using a broadcast or multicast message, so that the user equipment UE communicates with the base station eNB according to the information about the time resource and/or the frequency resource.

With reference to the first aspect, in a first possible implementation manner, the base station further includes:

an allocation unit, configured to: before the information about the time resource and/or the frequency resource is sent to the user equipment UE by using the broadcast or multicast message, allocate, to the user equipment UE, a parameter for obtaining the time resource and/or the frequency resource obtained by contention by the eNB on the unlicensed spectrum resource, where the parameter includes at least an unlicensed spectrum radio network temporary identifier U-RNTI, and the U-RNTI is used for detecting a physical downlink control channel PDCCH.

With reference to the first aspect or the first possible implementation manner of the first aspect, in a second possible implementation manner, the information about the time resource and/or the frequency resource includes at least the parameter of the time resource and/or the frequency resource on the unlicensed spectrum resource.

With reference to the first aspect, in a third possible implementation manner, the information about the time resource and/or the frequency resource includes at least:

a start time and an end time of the time resource and/or the frequency resource; or the time resource and/or the frequency resource obtained by contention by the base station.

With reference to the first aspect, in a fourth possible implementation manner, the sending unit is further specifically configured to:

when the base station eNB obtains by contention no time resource and/or no frequency resource, send the information about the time resource and/or the frequency resource to notify the UE that no time resource and/or no frequency resource are/is obtained by contention.

With reference to the first aspect or the third possible implementation manner of the first aspect, in a fifth possible implementation manner, the information about the time resource and/or the frequency resource further includes:

a time resource and/or a frequency resource on which the UE can perform uplink transmission and/or downlink transmission; and/or information about a time division duplex TDD configuration used by the UE on the time resource and/or the frequency resource.

With reference to the fifth possible implementation manner of the first aspect, in a sixth possible implementation manner, in the information about the time division duplex TDD configuration used by the UE on the time resource and/or the frequency resource, a start location of a start subframe of the TDD configuration starts from a start location of the time resource and/or the frequency resource obtained by contention by the base station eNB.

With reference to the first aspect, in a seventh possible implementation manner, the resource broadcast/multicast message is at least one of a Radio Resource Control RRC message, a Media Access Control control element MAC CE message, or physical downlink control channel PDCCH signaling.

With reference to the first aspect, in an eighth possible implementation manner, the sending unit is further specifically configured to:

notify, on a physical downlink control channel PDCCH of the unlicensed spectrum, the UE using the unlicensed spectrum of the information about the time resource and/or the frequency resource obtained by contention; or send the information about the time resource and/or the frequency resource obtained by contention to all user equipment or a group of user equipment UE by using common search space CSS of a physical downlink control channel PDCCH; or send the information about the time resource and/or the frequency resource obtained by contention to at least one user equipment UE by using user equipment UE search space USS of a physical downlink control channel PDCCH.

With reference to the eighth possible implementation manner of the first aspect, in a ninth possible implementation manner, the sending unit is further specifically configured to:

before notifying, on the physical downlink control channel PDCCH of the unlicensed spectrum, the UE of the information about the time resource and/or the frequency resource obtained by contention, send a time pattern configuration message to the UE, where the time pattern configuration message includes a time pattern parameter that is for listening to PDCCH signaling in an unlicensed cell and is allocated by the eNB to the UE, so that the UE determines, according to the time pattern parameter, a time pattern for listening to PDCCH signaling sent by the base station eNB in the unlicensed cell.

With reference to the first aspect, in a tenth possible implementation manner, the resource broadcast/multicast message is repeatedly sent within a valid time of a resource obtained by contention.

According to a second aspect, user equipment is provided, including:

a receiving unit, configured to receive information that is about a time resource and/or a frequency resource obtained by contention by a base station eNB in an unlicensed spectrum and is sent by the base station; and a transmission unit, configured to communicate with the base station eNB according to the information that is about the time resource and/or the frequency resource and is received by the receiving unit.

With reference to the second aspect, in a first possible implementation manner, the receiving unit is further configured to: before receiving the information that is about the time resource and/or the frequency resource obtained by contention by the base station eNB in the unlicensed spectrum and is sent by the base station, receive a parameter that is of the time resource and/or the frequency resource obtained by contention on the unlicensed spectrum resource and is allocated by the base station eNB, where the parameter includes at least an unlicensed spectrum radio network temporary identifier U-RNTI, and the U-RNTI is used to instruct the UE to detect a physical downlink control channel PDCCH.

With reference to the second aspect or the first possible implementation manner of the second aspect, in a second possible implementation manner, the information about the time resource and/or the frequency resource includes at least the parameter of the time resource and/or the frequency resource on the unlicensed spectrum resource.

With reference to the second aspect, in a third possible implementation manner, the information about the time resource and/or the frequency resource includes at least:

a start time and an end time of the time resource and/or the frequency resource; or the time resource and/or the frequency resource obtained by contention by the base station.

With reference to the second aspect, in a fourth possible implementation manner, the receiving unit is further specifically configured to:

when the base station eNB obtains by contention no time resource and/or no frequency resource, receive the information about the time resource and/or the frequency resource to learn that the base station eNB obtains by contention no time resource and/or no frequency resource.

With reference to the second aspect, in a fifth possible implementation manner, the transmission unit is specifically configured to:

determine configuration information according to the information about the time resource and/or the frequency resource, where the UE performs at least the following operations to determine the configuration information according to the information about the time resource and/or the frequency resource:

calculating a valid time of the time resource and/or the frequency resource according to a start moment of received physical downlink control channel PDCCH scheduling signaling, or calculating a valid time of the time resource and/or the frequency resource according to a preset time; and/or detecting a primary synchronization signal PSS and/or a secondary synchronization signal SSS on the obtained time resource and/or frequency resource according to the time resource and/or the frequency resource; and/or determining a length of a DRX activation time according to a preset discontinuous reception DRX parameter and the received information about the time resource and/or the frequency resource; and/or determining, according to the preset discontinuous reception DRX parameter and the received information about the time resource and/or the frequency resource, an operation for a timer corresponding to DRX.

With reference to the fifth possible implementation manner of the second aspect, in a sixth possible implementation manner, the transmission unit is further specifically configured to:

when an end time of the time resource and/or the frequency resource in the received information about the time resource and/or the frequency resource arrives, or the DRX activation time determined according to the preset discontinuous reception DRX parameter and the received information about the time resource and/or the frequency resource expires, stop or suspend at least one timer corresponding to the DRX, where the timer corresponding to the DRX includes at least one of the following timers: an on-duration timer, a DRX activation time timer, a DRX retransmission timer, a DRX short cycle timer, or a DRX long cycle timer.

With reference to the fifth possible implementation manner of the second aspect or the sixth possible implementation manner of the second aspect, in a seventh possible implementation manner, the transmission unit is further specifically configured to:

when the UE receives information that is about a new time resource and/or a new frequency resource obtained by contention and that is notified by the eNB, start or restart at least one of the following stopped or suspended DRX-related timers: the on-duration timer, the DRX activation time timer, the DRX retransmission timer, the DRX short cycle timer, or the DRX long cycle timer at a start time location of the new time resource and/or the new frequency resource obtained by contention, or within a preset time, or at a start location of the DRX activation time determined according to the preset discontinuous reception DRX parameter and the received information about the time resource and/or the frequency resource.

With reference to the fifth possible implementation manner of the second aspect, in an eighth possible implementation manner, a start location of transmit timing of the PSS and/or the SSS starts from a start location of the time resource and/or the frequency resource obtained by contention.

With reference to the eighth possible implementation manner of the second aspect, in a ninth possible implementation manner, the transmission unit is further specifically configured to:

use the start location of the time resource and/or the frequency resource obtained by contention as a frame 0 and/or a subframe 0; or count, by following the last frame number and/or the last subframe number on a resource obtained by contention previous time, a frame number and a subframe number of the start location of the time resource and/or the frequency resource obtained by contention.

With reference to the second aspect, in a tenth possible implementation manner, the transmission unit is further specifically configured to:

transmit data according to the information about the time resource and/or the frequency resource and by observing at least one of the following principles:

when the UE transmits uplink data according to the information about the time resource and/or the frequency resource, a hybrid automatic repeat request-acknowledgment HARQ-ACK corresponding to uplink data transmission in the last N subframes indicated in the time resource and/or the frequency resource should be received on a carrier corresponding to a licensed spectrum, or on an anchor carrier, or on a carrier corresponding to another unlicensed spectrum in which downlink transmission can be performed, where N in "the last N subframes" is a positive integer; and/or when the UE receives downlink data according to the information about the time resource and/or the frequency resource, a hybrid automatic repeat request-acknowledgment HARQ-ACK corresponding to downlink data receiving in the last N subframes indicated in the time resource and/or the frequency resource should be transmitted on a carrier corresponding to a licensed spectrum, or on an anchor carrier, or on a carrier corresponding to another unlicensed spectrum in which uplink transmission can be performed, or the HARQ-ACK is received, within a preset time after being delayed, on a time resource and/or a frequency resource that are/is obtained by contention next time and are/is used for data transmission, where N in "the last N subframes" is a positive integer.

With reference to the second aspect, in an eleventh possible implementation manner, the receiving unit is further configured to:

receive corresponding physical downlink control channel PDCCH signaling sent by the base station eNB, where the PDCCH signaling is used to instruct the UE to obtain the information about the time resource and/or the frequency resource obtained by contention by the base station eNB; and obtain information about a corresponding time resource and/or frequency resource according to the PDCCH signaling.

With reference to the second aspect, in a twelfth possible implementation manner, the transmission unit is further specifically configured to:

determine a time pattern for listening on a PDCCH channel in an unlicensed cell; and listen to, according to the determined time pattern, PDCCH signaling sent by the base station eNB in the unlicensed cell, where the PDCCH signaling includes the information about the time resource and/or the frequency resource obtained by contention by the eNB in the unlicensed spectrum.

With reference to the twelfth possible implementation manner of the second aspect, in a thirteenth possible implementation manner, the transmission unit is further specifically configured to:

determine, according to a time pattern parameter value preset in a system, a time for listening to the PDCCH signaling in the unlicensed cell; or receive a time pattern parameter configuration message sent by the eNB, where the time pattern configuration message includes a time pattern parameter that is for listening to the PDCCH signaling in the unlicensed cell and that is allocated by the eNB to the UE.

With reference to the second aspect, in a fourteenth possible implementation manner, the information about the time resource and/or the frequency resource further includes at least:

a time resource and/or a frequency resource on which the UE can perform uplink transmission and/or downlink transmission; and/or information about a time division duplex TDD configuration used by the UE on the time resource and/or the frequency resource.

With reference to the fourteenth possible implementation manner of the second aspect, in a fifteenth possible implementation manner, in the information about the time division duplex TDD configuration used by the UE on the time resource and/or the frequency resource, a start location of a start frame and/or a start subframe of the TDD configuration starts from a start location of the time resource and/or the frequency resource obtained by contention by the base station eNB.

According to a third aspect, a base station is provided, including a processor and a memory that are connected by using a data bus, and at least one communications interface separately connected to the processor and the memory, where the processor is configured to obtain a time resource and/or a frequency resource by contending with another eNB or another system using an unlicensed spectrum;

the processor is further configured to generate information about the time resource and/or the frequency resource according to the time resource and/or the frequency resource; and the processor is further configured to send the information about the time resource and/or the frequency resource to user equipment UE by using a broadcast or multicast message and the at least one communications interface, so that the user equipment UE communicates with the base station eNB according to the information about the time resource and/or the frequency resource.

With reference to the third aspect, in a first possible implementation manner, the processor is further configured to: before the information about the time resource and/or the frequency resource is sent to the user equipment UE by using the broadcast or multicast message and the at least one communications interface, allocate, to the user equipment UE, a parameter for obtaining the time resource and/or the frequency resource obtained by contention by the eNB on the unlicensed spectrum resource, where the parameter includes at least an unlicensed spectrum radio network temporary identifier U-RNTI, and the U-RNTI is used for detecting a physical downlink control channel PDCCH.

With reference to the third aspect or the first possible implementation manner of the third aspect, in a second possible implementation manner, the information about the time resource and/or the frequency resource includes at least the parameter of the time resource and/or the frequency resource on the unlicensed spectrum resource.

With reference to the third aspect, in a third possible implementation manner, the information about the time resource and/or the frequency resource includes at least:

a start time and an end time of the time resource and/or the frequency resource; or the time resource and/or the frequency resource obtained by contention by the base station.

With reference to the third aspect, in a fourth possible implementation manner, the processor is further configured to: when the base station eNB obtains by contention no time resource and/or no frequency resource, send the information about the time resource and/or the frequency resource by using the at least one communications interface to notify the UE that no time resource and/or no frequency resource are/is obtained by contention.

With reference to the third aspect or the third possible implementation manner of the third aspect, in a fifth possible implementation manner, the information about the time resource and/or the frequency resource further includes:

a time resource and/or a frequency resource on which the UE can perform uplink transmission and/or downlink transmission; and/or information about a time division duplex TDD configuration used by the UE on the time resource and/or the frequency resource.

With reference to the fifth possible implementation manner of the third aspect, in a sixth possible implementation manner, in the information about the time division duplex TDD configuration used by the UE on the time resource and/or the frequency resource, a start location of a start subframe of the TDD configuration starts from a start location of the time resource and/or the frequency resource obtained by contention by the base station eNB.

With reference to the third aspect, in a seventh possible implementation manner, the resource broadcast/multicast message is at least one of a Radio Resource Control RRC message, a Media Access Control control element MAC CE message, or physical downlink control channel PDCCH signaling.

With reference to the third aspect, in an eighth possible implementation manner, the processor is further specifically configured to:

notify, on a physical downlink control channel PDCCH of the unlicensed spectrum, the UE using the unlicensed spectrum of the information about the time resource and/or the frequency resource obtained by contention; or send the information about the time resource and/or the frequency resource obtained by contention to all user equipment or a group of user equipment UE by using common search space CSS of a physical downlink control channel PDCCH and the at least one communications interface; or send the information about the time resource and/or the frequency resource obtained by contention to at least one user equipment UE by using user equipment UE search space USS of a physical downlink control channel PDCCH and the at least one communications interface.

With reference to the eighth possible implementation manner of the third aspect, in a ninth possible implementation manner, the processor is further specifically configured to:

before notifying, on the physical downlink control channel PDCCH of the unlicensed spectrum by using the at least one communications interface, the UE of the information about the time resource and/or the frequency resource obtained by contention, send a time pattern configuration message to the UE, where the time pattern configuration message includes a time pattern parameter that is for listening to PDCCH signaling in an unlicensed cell and is allocated by the eNB to the UE, so that the UE determines, according to the time pattern parameter, a time pattern for listening to PDCCH signaling sent by the base station eNB in the unlicensed cell.

With reference to the third aspect, in a tenth possible implementation manner, the resource broadcast/multicast message is repeatedly sent within a valid time of a resource obtained by contention.

According to a fourth aspect, user equipment is provided, including a processor and a memory that are connected by using a data bus, and at least one communications interface separately connected to the processor and the memory, where the processor is configured to receive, by using the at least one communications interface, information that is about a time resource and/or a frequency resource obtained by contention by a base station eNB in an unlicensed spectrum and is sent by the base station; and the processor is further configured to communicate with the base station eNB according to the information about the time resource and/or the frequency resource and by using the at least one communications interface.

With reference to the fourth aspect, in a first possible implementation manner, the processor is further configured to: before receiving, by using the at least one communications interface, the information that is about the time resource and/or the frequency resource obtained by contention by the base station eNB in the unlicensed spectrum and is sent by the base station, receive, by using the at least one communications interface, a parameter that is of the time resource and/or the frequency resource obtained by contention on the unlicensed spectrum resource and is allocated by the base station eNB, where the parameter includes at least an unlicensed spectrum radio network temporary identifier U-RNTI, and the U-RNTI is used to instruct the UE to detect a physical downlink control channel PDCCH.

With reference to the fourth aspect or the first possible implementation manner of the fourth aspect, in a second possible implementation manner, the information about the time resource and/or the frequency resource includes at least the parameter of the time resource and/or the frequency resource on the unlicensed spectrum resource.

With reference to the fourth aspect, in a third possible implementation manner, the information about the time resource and/or the frequency resource includes at least:

a start time and an end time of the time resource and/or the frequency resource; or the time resource and/or the frequency resource obtained by contention by the base station.

With reference to the fourth aspect, in a fourth possible implementation manner, the processor is further configured to: when the base station eNB obtains by contention no time resource and/or no frequency resource, receive the information about the time resource and/or the frequency resource by using the at least one communications interface to learn that the base station eNB obtains by contention no time resource and/or no frequency resource.

With reference to the fourth aspect, in a fifth possible implementation manner, the processor is specifically configured to:

determine configuration information according to the information about the time resource and/or the frequency resource, where the UE performs at least the following operations to determine the configuration information according to the information about the time resource and/or the frequency resource:

calculating a valid time of the time resource and/or the frequency resource according to a start moment of received physical downlink control channel PDCCH scheduling signaling, or calculating a valid time of the time resource and/or the frequency resource according to a preset time; and/or detecting a primary synchronization signal PSS and/or a secondary synchronization signal SSS on the obtained time resource and/or frequency resource according to the time resource and/or the frequency resource; and/or determining a length of a DRX activation time according to a preset discontinuous reception DRX parameter and the received information about the time resource and/or the frequency resource;

and/or determining, according to the preset discontinuous reception DRX parameter and the received information about the time resource and/or the frequency resource, an operation for a timer corresponding to DRX.

With reference to the fifth possible implementation manner of the fourth aspect, in a sixth possible implementation manner, the processor is further specifically configured to:

when an end time of the time resource and/or the frequency resource in the received information about the time resource and/or the frequency resource arrives, or the DRX activation time determined according to the preset discontinuous reception DRX parameter and the received information about the time resource and/or the frequency resource expires, stop or suspend at least one timer corresponding to the DRX, where the timer corresponding to the DRX includes at least one of the following timers: an on-duration timer, a DRX activation time timer, a DRX retransmission timer, a DRX short cycle timer, or a DRX long cycle timer.

With reference to the fifth possible implementation manner of the fourth aspect or the sixth possible implementation manner of the fourth aspect, in a seventh possible implementation manner, the processor is further specifically configured to:

when the UE receives information that is about a new time resource and/or a new frequency resource obtained by contention and that is notified by the eNB, start or restart at least one of the following stopped or suspended DRX-related timers: the on-duration timer, the DRX activation time timer, the DRX retransmission timer, the DRX short cycle timer, or the DRX long cycle timer at a start time location of the new time resource and/or the new frequency resource obtained by contention, or within a preset time, or at a start location of the DRX activation time determined according to the preset discontinuous reception DRX parameter and the received information about the time resource and/or the frequency resource.

With reference to the fifth possible implementation manner of the fourth aspect, in an eighth possible implementation manner, a start location of transmit timing of the PSS and/or the SSS starts from a start location of the time resource and/or the frequency resource obtained by contention.

With reference to the eighth possible implementation manner of the fourth aspect, in a ninth possible implementation manner, the processor is further specifically configured to:

use the start location of the time resource and/or the frequency resource obtained by contention as a frame 0 and/or a subframe 0; or count, by following the last frame number and/or the last subframe number on a resource obtained by contention previous time, a frame number and a subframe number of the start location of the time resource and/or the frequency resource obtained by contention.

With reference to the fourth aspect, in a tenth possible implementation manner, the processor is further specifically configured to:

transmit data according to the information about the time resource and/or the frequency resource and by observing at least one of the following principles:

when the UE transmits uplink data according to the information about the time resource and/or the frequency resource, a hybrid automatic repeat request-acknowledgment HARQ-ACK corresponding to uplink data transmission in the last N subframes indicated in the time resource and/or the frequency resource should be received on a carrier corresponding to a licensed spectrum, or on an anchor carrier, or on a carrier corresponding to another unlicensed spectrum in which downlink transmission can be performed, where N in "the last N subframes" is a positive integer; and/or when the UE receives downlink data according to the information about the time resource and/or the frequency resource, a hybrid automatic repeat request-acknowledgment HARQ-ACK corresponding to downlink data receiving in the last N subframes indicated in the time resource and/or the frequency resource should be transmitted on a carrier corresponding to a licensed spectrum, or on an anchor carrier, or on a carrier corresponding to another unlicensed spectrum in which uplink transmission can be performed, or the HARQ-ACK is received, within a preset time after being delayed, on a time resource and/or a frequency resource that are/is obtained by contention next time and are/is used for data transmission, where N in "the last N subframes" is a positive integer.

With reference to the fourth aspect, in an eleventh possible implementation manner, the processor is further specifically configured to:

receive, by using the at least one communications interface, corresponding physical downlink control channel PDCCH signaling sent by the base station eNB, where the PDCCH signaling is used to instruct the UE to obtain the information about the time resource and/or the frequency resource obtained by contention by the base station eNB; and obtain information about a corresponding time resource and/or frequency resource according to the PDCCH signaling.

With reference to the fourth aspect, in a twelfth possible implementation manner, the processor is further specifically configured to:

determine a time pattern for listening on a PDCCH channel in an unlicensed cell; and listen to, according to the determined time pattern, PDCCH signaling sent by the base station eNB in the unlicensed cell, where the PDCCH signaling includes the information about the time resource and/or the frequency resource obtained by contention by the eNB in the unlicensed spectrum.

With reference to the twelfth possible implementation manner of the fourth aspect, in a thirteenth possible implementation manner, the processor is further specifically configured to:

determine, according to a time pattern parameter value preset in a system, a time for listening to the PDCCH signaling in the unlicensed cell; or receive, by using the at least one communications interface, a time pattern parameter configuration message sent by the eNB, where the time pattern configuration message includes a time pattern parameter that is for listening to the PDCCH signaling in the unlicensed cell and that is allocated by the eNB to the UE.

With reference to the fourth aspect, in a fourteenth possible implementation manner, the information about the time resource and/or the frequency resource further includes at least:

a time resource and/or a frequency resource on which the UE performs uplink transmission and/or downlink transmission; and/or a time division duplex TDD configuration used by the UE on the time resource and/or the frequency resource.

With reference to the fourteenth possible implementation manner of the fourth aspect, in a fifteenth possible implementation manner, in the information about the time division duplex TDD configuration used by the UE on the time resource and/or the frequency resource, a start location of a start frame and/or a start subframe of the TDD configuration starts from a start location of the time resource and/or the frequency resource obtained by contention by the base station eNB.

According to a fifth aspect, a method for performing communication by using an unlicensed spectrum is provided, including:

obtaining, by a base station eNB, a time resource and/or a frequency resource by contending with another eNB or another system using an unlicensed spectrum;

generating, by the base station eNB, information about the time resource and/or the frequency resource according to the time resource and/or the frequency resource; and sending, by the base station eNB, the information about the time resource and/or the frequency resource to user equipment UE by using a broadcast or multicast message, so that the user equipment UE communicates with the base station eNB according to the information about the time resource and/or the frequency resource.

With reference to the fifth aspect, in a first possible implementation manner, before the generating, by the base station eNB, information about the time resource and/or frequency resource according to the time resource and/or the frequency resource, the method further includes:

allocating, by the base station eNB to the user equipment UE, a parameter for obtaining the time resource and/or the frequency resource obtained by contention by the eNB on the unlicensed spectrum resource, where the parameter includes at least an unlicensed spectrum radio network temporary identifier U-RNTI, and the U-RNTI is used for detecting a physical downlink control channel PDCCH.

With reference to the fifth aspect or the first possible implementation manner of the fifth aspect, in a second possible implementation manner, the information about the time resource and/or the frequency resource includes at least the parameter of the time resource and/or the frequency resource on the unlicensed spectrum resource.

With reference to the fifth aspect, in a third possible implementation manner, the information about the time resource and/or the frequency resource includes at least:

a start time and an end time of the time resource and/or the frequency resource; or the time resource and/or the frequency resource obtained by contention by the base station.

With reference to the fifth aspect, in a fourth possible implementation manner, the obtaining, by a base station eNB, a time resource and/or a frequency resource by contending with another eNB or another system using an unlicensed spectrum further includes:

when the base station eNB obtains by contention no time resource and/or no frequency resource, sending, by the base station eNB, the information about the time resource and/or the frequency resource to notify the UE that no time resource and/or no frequency resource are/is obtained by contention.

With reference to the fifth aspect or the third possible implementation manner of the fifth aspect, in a fifth possible implementation manner, the information about the time resource and/or the frequency resource further includes:

information about a time resource and/or a frequency resource on which the UE can perform uplink transmission and/or downlink transmission; and/or information about a time division duplex TDD configuration used by the UE on the time resource and/or the frequency resource.

With reference to the fifth possible implementation manner of the fifth aspect, in a sixth possible implementation manner, in the information about the time division duplex TDD configuration used by the UE on the time resource and/or the frequency resource, a start location of a start subframe of the TDD configuration starts from a start location of the time resource and/or the frequency resource obtained by contention by the base station eNB.

With reference to the fifth aspect, in a seventh possible implementation manner, the resource broadcast/multicast message is at least a Radio Resource Control RRC message, a Media Access Control control element MAC CE message, or physical downlink control channel PDCCH signaling.

With reference to the fifth aspect, in an eighth possible implementation manner, the sending, by the base station eNB, the information about the time resource and/or the frequency resource to user equipment UE by using a broadcast or multicast message includes:

notifying, by the base station eNB on a physical downlink control channel PDCCH of the unlicensed spectrum, the UE using the unlicensed spectrum of the information about the time resource and/or the frequency resource obtained by contention; or sending, by the base station eNB, the information about the time resource and/or the frequency resource obtained by contention to all or a group of user equipment UE by using common search space CSS of a physical downlink control channel PDCCH; or sending, by the base station eNB, the information about the time resource and/or the frequency resource obtained by contention to at least one user equipment UE by using user equipment UE search space USS of a physical downlink control channel PDCCH.

With reference to the eighth possible implementation manner of the fifth aspect, in a ninth possible implementation manner, before the notifying, by the base station eNB on a physical downlink control channel PDCCH of the unlicensed spectrum, the UE of the information about the time resource and/or the frequency resource obtained by contention, the method further includes:

sending a time pattern configuration message to the UE, where the time pattern configuration message includes a time pattern parameter that is for listening to PDCCH signaling in an unlicensed cell and is allocated by the eNB to the UE, so that the UE determines, according to the time pattern parameter, a time pattern for listening to PDCCH signaling sent by the base station eNB in the unlicensed cell.

With reference to the fifth aspect, in a tenth possible implementation manner, the resource broadcast/multicast message is repeatedly sent within a valid time of a resource obtained by contention.

According to a sixth aspect, a method for performing communication by using an unlicensed spectrum is provided, including:

receiving, by user equipment UE, information that is about a time resource and/or a frequency resource obtained by contention by a base station eNB in an unlicensed spectrum and that is sent by the base station; and communicating, by the UE, with the base station eNB according to the information about the time resource and/or the frequency resource.

With reference to the sixth aspect, in a first possible implementation manner, before the receiving, by user equipment UE, information that is about a time resource and/or a frequency resource obtained by contention by a base station eNB in an unlicensed spectrum and is sent by the base station, the method further includes:

receiving, by the UE, a parameter that is of the time resource and/or the frequency resource obtained by contention on the unlicensed spectrum resource and is allocated by the base station eNB, where the parameter includes at least an unlicensed spectrum radio network temporary identifier U-RNTI, and the U-RNTI is used to instruct the UE to detect a physical downlink control channel PDCCH.

With reference to the sixth aspect or the first possible implementation manner of the sixth aspect, in a second possible implementation manner, the information about the time resource and/or the frequency resource includes at least the parameter of the time resource and/or the frequency resource on the unlicensed spectrum resource.

With reference to the sixth aspect, in a third possible implementation manner, the information about the time resource and/or the frequency resource includes at least:

a start time and an end time of the time resource and/or the frequency resource; or the time resource and/or the frequency resource obtained by contention by the base station.

With reference to the sixth aspect, in a fourth possible implementation manner, the receiving, by user equipment UE, information that is about a time resource and/or a frequency resource obtained by contention by a base station eNB in an unlicensed spectrum and is sent by the base station further includes:

when the base station eNB obtains by contention no time resource and/or no frequency resource, receiving, by the UE, the information about the time resource and/or the frequency resource to learn that the base station eNB obtains by contention no time resource and/or no frequency resource.

With reference to the sixth aspect, in a fifth possible implementation manner, the communicating, by the UE, with the base station according to the information about the time resource and/or the frequency resource further includes:

determining, by the UE, configuration information according to the information about the time resource and/or the frequency resource, where the UE performs at least the following operations to determine the configuration information according to the information about the time resource and/or the frequency resource:

calculating a valid time of the time resource and/or the frequency resource according to a start moment of received physical downlink control channel PDCCH scheduling signaling, or calculating a valid time of the time resource and/or the frequency resource according to a preset time; and/or detecting a primary synchronization signal PSS and/or a secondary synchronization signal SSS on the obtained time resource and/or frequency resource according to the time resource and/or the frequency resource; and/or determining a length of a DRX activation time according to a preset discontinuous reception DRX parameter and the received information about the time resource and/or the frequency resource; and/or determining, according to the preset discontinuous reception DRX parameter and the received information about the time resource and/or the frequency resource, an operation for a timer corresponding to DRX.

With reference to the fifth possible implementation manner of the sixth aspect, in a sixth possible implementation manner, the determining, according to the preset discontinuous reception DRX parameter and the received information about the time resource and/or the frequency resource, an operation for a timer corresponding to DRX specifically includes:

when an end time of the time resource and/or the frequency resource in the received information about the time resource and/or the frequency resource arrives, or the DRX activation time determined according to the preset discontinuous reception DRX parameter and the received information about the time resource and/or the frequency resource expires, stopping or suspending, by the UE, at least one timer corresponding to the DRX, where the timer corresponding to the DRX includes at least one of the following timers: an on-duration timer, a DRX activation time timer, a DRX retransmission timer, a DRX short cycle timer, or a DRX long cycle timer.

With reference to the fifth possible implementation manner of the sixth aspect or the sixth possible implementation manner of the sixth aspect, in a seventh possible implementation manner, the determining, according to the preset discontinuous reception DRX parameter and the received information about the time resource and/or the frequency resource, an operation for a timer corresponding to DRX specifically includes:

when the UE receives information that is about a new time resource and/or a new frequency resource obtained by contention and that is notified by the eNB, starting or restarting, by the UE, at least one of the following stopped or suspended DRX-related timers: the on-duration timer, the DRX activation time timer, the DRX retransmission timer, the DRX short cycle timer, or the DRX long cycle timer at a start time location of the new time resource and/or the new frequency resource obtained by contention, or within a preset time, or at a start location of the DRX activation time determined according to the preset discontinuous reception DRX parameter and the received information about the time resource and/or the frequency resource.

With reference to the fifth possible implementation manner of the sixth aspect, in an eighth possible implementation manner, the detecting a primary synchronization signal PSS and/or a secondary synchronization signal SSS on the obtained time resource and/or frequency resource according to the time resource and/or the frequency resource includes:

starting a start location of transmit timing of the PSS and/or the SSS from a start location of the time resource and/or the frequency resource obtained by contention.

With reference to the eighth possible implementation manner of the sixth aspect, in a ninth possible implementation manner, the starting a start location of transmit timing of the PSS and/or the SSS from a start location of the time resource and/or the frequency resource obtained by contention includes:

using the start location of the time resource and/or the frequency resource obtained by contention as a frame 0 and/or a subframe 0; or counting, by following the last frame number and/or the last subframe number on a resource obtained by contention previous time, a frame number and a subframe number of the start location of the time resource and/or the frequency resource obtained by contention.

With reference to the sixth aspect, in a tenth possible implementation manner, the communicating, by the UE, with the base station according to the information about the time resource and/or the frequency resource includes:

transmitting, by the UE, data according to the information about the time resource and/or the frequency resource and by observing at least one of the following principles:

when the UE transmits uplink data according to the information about the time resource and/or the frequency resource, a hybrid automatic repeat request-acknowledgment HARQ-ACK corresponding to uplink data transmission in the last N subframes indicated in the time resource and/or the frequency resource should be received on a carrier corresponding to a licensed spectrum, or on an anchor carrier, or on a carrier corresponding to another unlicensed spectrum in which downlink transmission can be performed, where N in "the last N subframes" is a positive integer; and/or when the UE receives downlink data according to the information about the time resource and/or the frequency resource, a hybrid automatic repeat request-acknowledgment HARQ-ACK corresponding to downlink data receiving in the last N subframes indicated in the time resource and/or the frequency resource should be transmitted on a carrier corresponding to a licensed spectrum, or on an anchor carrier, or on a carrier corresponding to another unlicensed spectrum in which uplink transmission can be performed, or the HARQ-ACK is received, within a preset time after being delayed, on a time resource and/or a frequency resource that are/is obtained by contention next time and are/is used for data transmission, where N in "the last N subframes" is a positive integer.

With reference to the sixth aspect, in an eleventh possible implementation manner, the receiving, by user equipment UE, information that is about a time resource and/or a frequency resource obtained by contention by a base station eNB in an unlicensed spectrum and is sent by the base station further includes:

receiving corresponding physical downlink control channel PDCCH signaling sent by the base station eNB, where the PDCCH signaling is used to instruct the UE to obtain the information about the time resource and/or the frequency resource obtained by contention by the base station eNB; and obtaining information about a corresponding time resource and/or frequency resource according to the PDCCH signaling.

With reference to the sixth aspect, in a twelfth possible implementation manner, the receiving, by user equipment UE, information that is about a time resource and/or a frequency resource obtained by contention by a base station eNB in an unlicensed spectrum and is sent by the base station further includes:

determining a time pattern for listening on a PDCCH channel in an unlicensed cell; and listening to, according to the determined time pattern, PDCCH signaling sent by the base station eNB in the unlicensed cell, where the PDCCH signaling includes the information about the time resource and/or the frequency resource obtained by contention by the eNB in the unlicensed spectrum.

With reference to the twelfth possible implementation manner of the sixth aspect, in a thirteenth possible implementation manner, the determining a time pattern for listening on a PDCCH channel in an unlicensed cell includes:

determining, by the UE according to a time pattern parameter value preset in a system, a time for listening to the PDCCH signaling in the unlicensed cell; or receiving, by the UE, a time pattern parameter configuration message sent by the eNB, where the time pattern configuration message includes a time pattern parameter that is for listening to the PDCCH signaling in the unlicensed cell and that is allocated by the eNB to the UE.

With reference to the sixth aspect, in a fourteenth possible implementation manner, the information about the time resource and/or the frequency resource further includes at least:

a time resource and/or a frequency resource on which the UE can perform uplink transmission and/or downlink transmission; and/or information about a time division duplex TDD configuration used by the UE on the time resource and/or the frequency resource.

With reference to the fourteenth possible implementation manner of the second aspect, in a fifteenth possible implementation manner, in the information about the time division duplex TDD configuration used by the UE on the time resource and/or the frequency resource, a start location of a start frame and/or a start subframe starts from a start location of the time resource and/or the frequency resource obtained by contention by the base station eNB.

According to a seventh aspect, a communications system is provided, including a base station eNB and at least one user equipment UE, where the base station eNB is the base station eNB according to the first aspect or any one of possible implementation manners of the first aspect; and the user equipment UE is the user equipment UE according to the second aspect or any one of possible implementation manners of the second aspect; or the base station eNB is the base station eNB according to the third aspect or any one of possible implementation manners of the third aspect; and the user equipment UE is the user equipment UE according to the fourth aspect or any one of possible implementation manners of the fourth aspect.

According to the method for performing communication by using an unlicensed spectrum, the device, and the system that are provided in the embodiments of the present invention, a base station eNB generates, by using a time resource and/or a frequency resource obtained by contending with another system using an unlicensed spectrum, information about the time resource and/or the frequency resource, and sends the information about the time resource and/or the frequency resource to user equipment, so that the user equipment transmits data on a time resource and/or a frequency resource allocated by the base station eNB, thereby improving efficiency of using an unlicensed spectrum by the user equipment.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
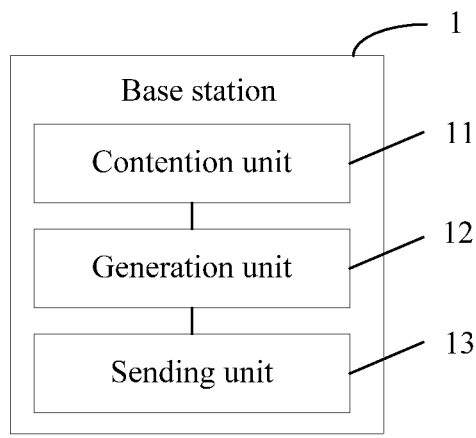
FIG. 1 is a schematic structural diagram of a base station according to an embodiment of the present invention.

The present invention provides a base station 1, and the base station eNB 1 is subject to implementation of any one of methods for performing communication by using an unlicensed spectrum provided in the embodiments of the present invention. Referring to FIG. 1, the base station eNB 1 includes:

a contention unit 11, configured to obtain a time resource and/or a frequency resource by contending with another eNB or another system using an unlicensed spectrum;

a generation unit 12, configured to generate information about the time resource and/or the frequency resource according to the time resource and/or the frequency resource obtained by contention by the contention unit; and a sending unit 13, configured to send the information that is about the time resource and/or the frequency resource and is generated by the generation unit to user equipment UE by using a broadcast or multicast message, so that the user equipment UE communicates with the base station eNB according to the information about the time resource and/or the frequency resource.

According to the base station provided in this embodiment of the present invention, the base station eNB generates, by using a time resource and/or a frequency resource obtained by contending with another system using an unlicensed spectrum, information about the time resource and/or the frequency resource, and sends the information about the time resource and/or the frequency resource to user equipment, so that the user equipment transmits data on a time resource and/or a frequency resource allocated by the base station eNB, thereby improving efficiency of using an unlicensed spectrum by the user equipment.

Figure 2:
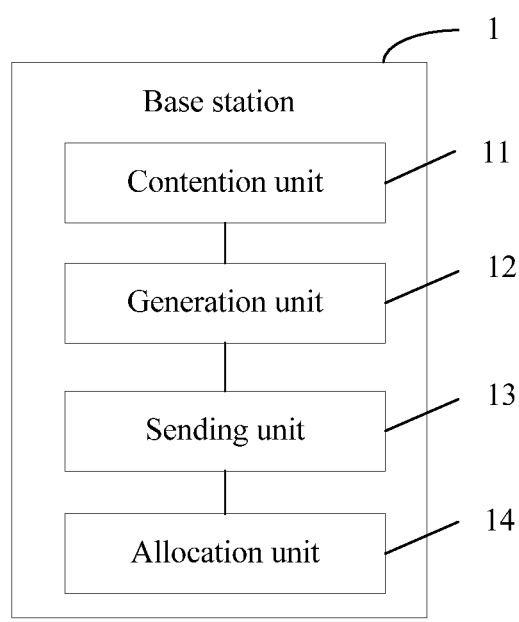
FIG. 2 is a schematic structural diagram of another base station according to an embodiment of the present invention.

Optionally, referring to FIG. 2, the base station 1 further includes:

an allocation unit 14, configured to: before the information about the time resource and/or the frequency resource is sent to the user equipment UE by using the broadcast or multicast message, allocate, to the user equipment UE, a parameter for obtaining the time resource and/or the frequency resource obtained by contention by the eNB on the unlicensed spectrum resource, where the parameter includes at least an unlicensed spectrum radio network temporary identifier U-RNTI, and the U-RNTI is used for detecting a physical downlink control channel PDCCH.

Further, the information about the time resource and/or the frequency resource includes at least the parameter of the time resource and/or the frequency resource on the unlicensed spectrum resource.

Optionally, the information about the time resource and/or the frequency resource includes at least:

a start time and an end time of the time resource and/or the frequency resource; or the time resource and/or the frequency resource obtained by contention by the base station.

The time resource and/or the frequency resource obtained by contention by the base station may be a remaining part of a segment of resource.

Optionally, the sending unit 13 is further specifically configured to:

when the base station eNB obtains by contention no time resource and/or no frequency resource, send the information about the time resource and/or the frequency resource to notify the UE that no time resource and/or no frequency resource are/is obtained by contention.

Further, optionally, the information about the time resource and/or the frequency resource further includes:

a time resource and/or a frequency resource on which the UE can perform uplink transmission and/or downlink transmission; and/or information about a time division duplex TDD configuration used by the UE on the time resource and/or the frequency resource.

Further, in the information about the time division duplex TDD configuration used by the UE on the time resource and/or the frequency resource, a start location of a start subframe of the TDD configuration starts from a start location of the time resource and/or the frequency resource obtained by contention by the base station eNB.

Optionally, the resource broadcast/multicast message is at least one of a Radio Resource Control RRC message, a Media Access Control control element MAC CE message, or physical downlink control channel PDCCH signaling.

Optionally, the sending unit 13 is further specifically configured to: notify, on a physical downlink control channel PDCCH of the unlicensed spectrum, the UE using the unlicensed spectrum of the information about the time resource and/or the frequency resource obtained by contention; or send the information about the time resource and/or the frequency resource obtained by contention to all user equipment or a group of user equipment UE by using common search space CSS of a physical downlink control channel PDCCH; or send the information about the time resource and/or the frequency resource obtained by contention to at least one user equipment UE by using user equipment UE search space USS of a physical downlink control channel PDCCH.

Optionally, the sending unit 13 is further specifically configured to: before notifying, on the physical downlink control channel PDCCH of the unlicensed spectrum, the UE of the information about the time resource and/or the frequency resource obtained by contention, send a time pattern configuration message to the UE, where the time pattern configuration message includes a time pattern parameter that is for listening to PDCCH signaling in an unlicensed cell and is allocated by the eNB to the UE, so that the UE determines, according to the time pattern parameter, a time pattern for listening to PDCCH signaling sent by the base station eNB in the unlicensed cell.

Optionally, the resource broadcast/multicast message is repeatedly sent within a valid time of a resource obtained by contention.

According to the base station provided in this embodiment of the present invention, the base station eNB generates, by using a time resource and/or a frequency resource obtained by contending with another system using an unlicensed spectrum, information about the time resource and/or the frequency resource, and sends the information about the time resource and/or the frequency resource to user equipment, so that the user equipment transmits data on a time resource and/or a frequency resource allocated by the base station eNB, thereby improving efficiency of using an unlicensed spectrum by the user equipment. In addition, by means of sending PDCCH scheduling signaling, a timer inside the user equipment can be adjusted and controlled, thereby reducing power consumption of the user equipment.

Figure 3:
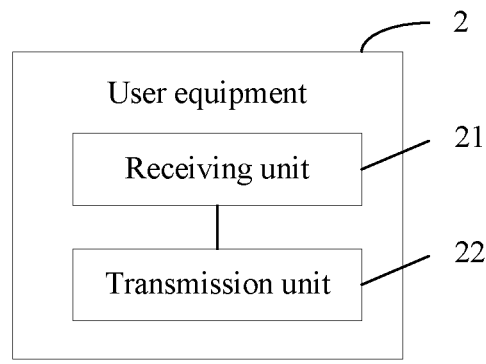
FIG. 3 is a schematic structural diagram of user equipment according to an embodiment of the present invention.

The present invention provides user equipment 2, and the user equipment 2 is subject to implementation of any one of methods for performing communication by using an unlicensed spectrum provided in the embodiments of the present invention. Referring to FIG. 3, the user equipment 2 includes:

a receiving unit 21, configured to receive information that is about a time resource and/or a frequency resource obtained by contention by a base station eNB in an unlicensed spectrum and is sent by the base station; and a transmission unit 22, configured to communicate with the base station eNB according to the information that is about the time resource and/or the frequency resource and is received by the receiving unit.

According to the user equipment provided in this embodiment of the present invention, a base station eNB generates, by using a time resource and/or a frequency resource obtained by contending with another system using an unlicensed spectrum, information about the time resource and/or the frequency resource, and sends the information about the time resource and/or the frequency resource to the user equipment, so that the user equipment transmits data on a time resource and/or a frequency resource allocated by the base station eNB, thereby improving efficiency of using an unlicensed spectrum by the user equipment.

Optionally, the receiving unit 21 is further configured to: before receiving the information that is about the time resource and/or the frequency resource obtained by contention by the base station eNB in the unlicensed spectrum and is sent by the base station, receive a parameter that is of the time resource and/or the frequency resource obtained by contention on the unlicensed spectrum resource and is allocated by the base station eNB, where the parameter includes at least an unlicensed spectrum radio network temporary identifier U-RNTI, and the U-RNTI is used to instruct the UE to detect a physical downlink control channel PDCCH.

Further, the information about the time resource and/or the frequency resource includes at least the parameter of the time resource and/or the frequency resource on the unlicensed spectrum resource.

Optionally, the information about the time resource and/or the frequency resource includes at least:

a start time and an end time of the time resource and/or the frequency resource; or the time resource and/or the frequency resource obtained by contention by the base station.

Optionally, the receiving unit 21 is further specifically configured to: when the base station eNB obtains by contention no time resource and/or no frequency resource, receive the information about the time resource and/or the frequency resource to learn that the base station eNB obtains by contention no time resource and/or no frequency resource.

Optionally, the transmission unit 22 is specifically configured to:

determine configuration information according to the information about the time resource and/or the frequency resource, where the UE performs at least the following operations to determine the configuration information according to the information about the time resource and/or the frequency resource:

calculating a valid time of the time resource and/or the frequency resource according to a start moment of received physical downlink control channel PDCCH scheduling signaling, or calculating a valid time of the time resource and/or the frequency resource according to a preset time; and/or detecting a primary synchronization signal PSS and/or a secondary synchronization signal SSS on the obtained time resource and/or frequency resource according to the time resource and/or the frequency resource; and/or determining a length of a DRX activation time according to a preset discontinuous reception DRX parameter and the received information about the time resource and/or the frequency resource; and/or determining, according to the preset discontinuous reception DRX parameter and the received information about the time resource and/or the frequency resource, an operation for a timer corresponding to DRX.

Further, the transmission unit 22 is further specifically configured to: when an end time of the time resource and/or the frequency resource in the received information about the time resource and/or the frequency resource arrives, or the DRX activation time determined according to the preset discontinuous reception DRX parameter and the received information about the time resource and/or the frequency resource expires, stop or suspend at least one timer corresponding to the DRX, where the timer corresponding to the DRX includes at least one of the following timers: an on-duration timer, a DRX activation time timer, a DRX retransmission timer, a DRX short cycle timer, or a DRX long cycle timer.

Further, optionally, the transmission unit 22 is further specifically configured to:

when the UE receives information that is about a new time resource and/or a new frequency resource obtained by contention and that is notified by the eNB, start or restart at least one of the following stopped or suspended DRX-related timers: the on-duration timer, the DRX activation time timer, the DRX retransmission timer, the DRX short cycle timer, or the DRX long cycle timer at a start time location of the new time resource and/or the new frequency resource obtained by contention, or within a preset time, or at a start location of the DRX activation time determined according to the preset discontinuous reception DRX parameter and the received information about the time resource and/or the frequency resource.

Optionally, a start location of transmit timing of the PSS and/or the SSS starts from a start location of the time resource and/or the frequency resource obtained by contention.

Further, optionally, the transmission unit 22 is further specifically configured to:

use the start location of the time resource and/or the frequency resource obtained by contention as a frame 0 and/or a subframe 0; or count, by following the last frame number and/or the last subframe number on a resource obtained by contention previous time, a frame number and a subframe number of the start location of the time resource and/or the frequency resource obtained by contention.

Optionally, the transmission unit 22 is further specifically configured to:

transmit data according to the information about the time resource and/or the frequency resource and by observing at least one of the following principles:

when the UE transmits uplink data according to the information about the time resource and/or the frequency resource, a hybrid automatic repeat request-acknowledgment HARQ-ACK corresponding to uplink data transmission in the last N subframes indicated in the time resource and/or the frequency resource should be received on a carrier corresponding to a licensed spectrum, or on an anchor carrier, or on a carrier corresponding to another unlicensed spectrum in which downlink transmission can be performed, where N in "the last N subframes" is a positive integer; and/or when the UE receives downlink data according to the information about the time resource and/or the frequency resource, a hybrid automatic repeat request-acknowledgment HARQ-ACK corresponding to downlink data receiving in the last N subframes indicated in the time resource and/or the frequency resource should be transmitted on a carrier corresponding to a licensed spectrum, or on an anchor carrier, or on a carrier corresponding to another unlicensed spectrum in which uplink transmission can be performed, or the HARQ-ACK is received, within a preset time after being delayed, on a time resource and/or a frequency resource that are/is obtained by contention next time and are/is used for data transmission, where N in "the last N subframes" is a positive integer.

Optionally, the receiving unit 21 is further configured to:

receive corresponding physical downlink control channel PDCCH signaling sent by the base station eNB, where the PDCCH signaling is used to instruct the UE to obtain the information about the time resource and/or the frequency resource obtained by contention by the base station eNB; and obtain information about a corresponding time resource and/or frequency resource according to the PDCCH signaling.

Optionally, the transmission unit 22 is further specifically configured to:

determine a time pattern for listening on a PDCCH channel in an unlicensed cell; and listen to, according to the determined time pattern, PDCCH signaling sent by the base station eNB in the unlicensed cell, where the PDCCH signaling includes the information about the time resource and/or the frequency resource obtained by contention by the eNB in the unlicensed spectrum.

Further, the transmission unit 22 is further specifically configured to:

determine, according to a time pattern parameter value preset in a system, a time for listening to the PDCCH signaling in the unlicensed cell; or receive a time pattern parameter configuration message sent by the eNB, where the time pattern configuration message includes a time pattern parameter that is for listening to the PDCCH signaling in the unlicensed cell and that is allocated by the eNB to the UE.

Optionally, the information about the time resource and/or the frequency resource further includes at least:

a time resource and/or a frequency resource on which the UE can perform uplink transmission and/or downlink transmission; and/or information about a time division duplex TDD configuration used by the UE on the time resource and/or the frequency resource.

Further, in the information about the time division duplex TDD configuration used by the UE on the time resource and/or the frequency resource, a start location of a start frame and/or a start subframe of the TDD configuration starts from a start location of the time resource and/or the frequency resource obtained by contention by the base station eNB.

According to the user equipment provided in this embodiment of the present invention, a base station eNB generates, by using a time resource and/or a frequency resource obtained by contending with another system using an unlicensed spectrum, information about the time resource and/or the frequency resource, and sends the information about the time resource and/or the frequency resource to the user equipment, so that the user equipment transmits data on a time resource and/or a frequency resource allocated by the base station eNB, thereby improving efficiency of using an unlicensed spectrum by the user equipment. In addition, by means of sending PDCCH scheduling signaling, a timer inside the user equipment can be adjusted and controlled, thereby reducing power consumption of the user equipment.

Figure 4:
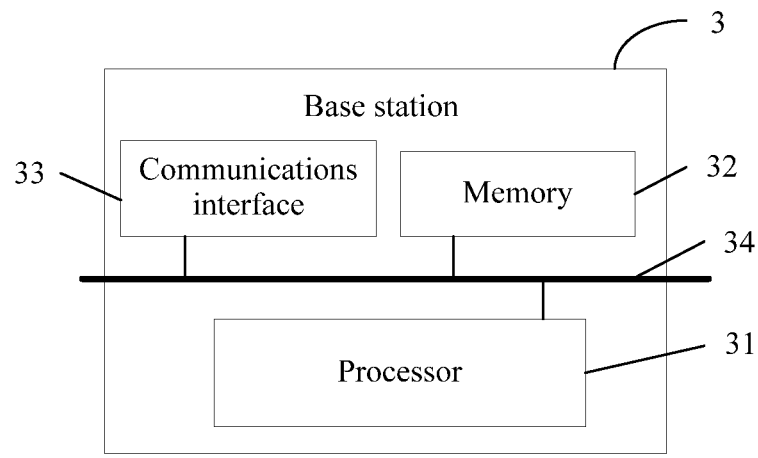
FIG. 4 is a schematic structural diagram of a base station according to another embodiment of the present invention.

An embodiment of the present invention provides a base station eNB 3. Referring to FIG. 4, the base station eNB 3 includes at least one processor 31, a memory 32, a communications interface 33, and a bus 34. The at least one processor 31, the memory 32, and the communications interface 33 are connected by using the bus 34, and implement communication with each other by using the bus 34.

The bus 34 may be an industry standard architecture (Industry Standard Architecture, ISA for short) bus, a Peripheral Component Interconnect (Peripheral Component, PCI for short) bus, an extended industry standard architecture (Extended Industry Standard Architecture, EISA) bus, or the like. The bus 34 may be classified into an address bus, a data bus, a control bus, and the like. For ease of representation, only one thick line is used in FIG. 4 to represent the bus 34, which, however, does not mean that there is only one bus or only one type of bus.

The memory 32 is configured to store executable program code, where the program code includes a computer operation instruction. The memory 32 may include a high-speed RAM memory, and may further include a nonvolatile memory (non-volatile memory), such as at least one disk memory.

The processor 31 may be a central processing unit (Central Processing Unit, CPU for short), or an application-specific integrated circuit (Application Specific Integrated Circuit, ASIC for short), or may be configured as one or more integrated circuits that implement this embodiment of the present invention.

The communications interface 33 is mainly configured to implement communication between apparatuses in this embodiment.

The processor 31 is configured to obtain a time resource and/or a frequency resource by contending with another eNB or another system using an unlicensed spectrum.

The processor 31 is further configured to generate information about the time resource and/or the frequency resource according to the time resource and/or the frequency resource.

The processor 31 is further configured to send the information about the time resource and/or the frequency resource to user equipment UE by using a broadcast or multicast message and the at least one communications interface 33, so that the user equipment UE communicates with the base station eNB according to the information about the time resource and/or the frequency resource.

According to the base station provided in this embodiment of the present invention, the base station eNB generates, by using a time resource and/or a frequency resource obtained by contending with another system using an unlicensed spectrum, information about the time resource and/or the frequency resource, and sends the information about the time resource and/or the frequency resource to user equipment, so that the user equipment transmits data on a time resource and/or a frequency resource allocated by the base station eNB, thereby improving efficiency of using an unlicensed spectrum by the user equipment.

Optionally, the processor 31 is further configured to: before the information about the time resource and/or the frequency resource is sent to the user equipment UE by using the broadcast or multicast message and the at least one communications interface 33, allocate, to the user equipment UE, a parameter for obtaining the time resource and/or the frequency resource obtained by contention by the eNB on the unlicensed spectrum resource, where the parameter includes at least an unlicensed spectrum radio network temporary identifier U-RNTI, and the U-RNTI is used for detecting a physical downlink control channel PDCCH.

Further, the information about the time resource and/or the frequency resource includes at least the parameter of the time resource and/or the frequency resource on the unlicensed spectrum resource.

Optionally, the information about the time resource and/or the frequency resource includes at least:

a start time and an end time of the time resource and/or the frequency resource; or the time resource and/or the frequency resource obtained by contention by the base station.

Optionally, the processor 31 is further configured to: when the base station eNB obtains by contention no time resource and/or no frequency resource, send the information about the time resource and/or the frequency resource by using the at least one communications interface 33 to notify the UE that no time resource and/or no frequency resource are/is obtained by contention.

Optionally, the information about the time resource and/or the frequency resource further includes:

a time resource and/or a frequency resource on which the UE can perform uplink transmission and/or downlink transmission; and/or information about a time division duplex TDD configuration used by the UE on the time resource and/or the frequency resource.

Further, in the information about the time division duplex TDD configuration used by the UE on the time resource and/or the frequency resource, a start location of a start subframe of the TDD configuration starts from a start location of the time resource and/or the frequency resource obtained by contention by the base station eNB.

Optionally, the resource broadcast/multicast message is at least one of a Radio Resource Control RRC message, a Media Access Control control element MAC CE message, or physical downlink control channel PDCCH signaling.

Optionally, the processor 31 is further specifically configured to:

notify, on a physical downlink control channel PDCCH of the unlicensed spectrum, the UE using the unlicensed spectrum of the information about the time resource and/or the frequency resource obtained by contention; or send the information about the time resource and/or the frequency resource obtained by contention to all user equipment or a group of user equipment UE by using common search space CSS of a physical downlink control channel PDCCH and the at least one communications interface 33; or send the information about the time resource and/or the frequency resource obtained by contention to at least one user equipment UE by using user equipment UE search space USS of a physical downlink control channel PDCCH and the at least one communications interface 33.

Optionally, the processor 31 is further specifically configured to: before notifying, on the physical downlink control channel PDCCH of the unlicensed spectrum by using the at least one communications interface 33, the UE of the information about the time resource and/or the frequency resource obtained by contention, send a time pattern configuration message to the UE, where the time pattern configuration message includes a time pattern parameter that is for listening to PDCCH signaling in an unlicensed cell and is allocated by the eNB to the UE, so that the UE determines, according to the time pattern parameter, a time pattern for listening to PDCCH signaling sent by the base station eNB in the unlicensed cell.

Optionally, the resource broadcast/multicast message is repeatedly sent within a valid time of a resource obtained by contention.

According to the base station provided in this embodiment of the present invention, the base station eNB generates, by using a time resource and/or a frequency resource obtained by contending with another system using an unlicensed spectrum, information about the time resource and/or the frequency resource, and sends the information about the time resource and/or the frequency resource to user equipment, so that the user equipment transmits data on a time resource and/or a frequency resource allocated by the base station eNB, thereby improving efficiency of using an unlicensed spectrum by the user equipment. In addition, by means of sending PDCCH scheduling signaling, a timer inside the user equipment can be adjusted and controlled, thereby reducing power consumption of the user equipment.

Figure 5:
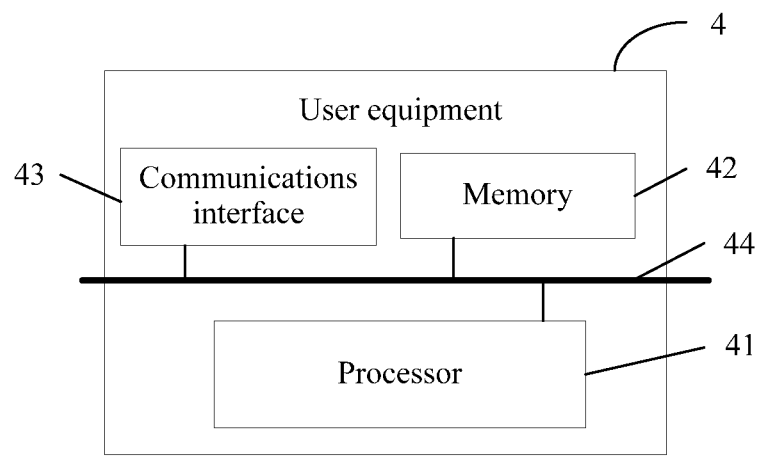
FIG. 5 is a schematic structural diagram of user equipment according to another embodiment of the present invention.

An embodiment of the present invention provides user equipment 4. Referring to FIG. 5, the user equipment 4 includes at least one processor 41, a memory 42, a communications interface 43, and a bus 44. The at least one processor 41, the memory 42, and the communications interface 43 are connected by using the bus 44, and implement communication with each other by using the bus 44.

The bus 44 may be an industry standard architecture (Industry Standard Architecture, ISA for short) bus, a Peripheral Component Interconnect (Peripheral Component, PCI for short) bus, an extended industry standard architecture (Extended Industry Standard Architecture, EISA) bus, or the like. The bus 44 may be classified into an address bus, a data bus, a control bus, and the like. For ease of representation, only one thick line is used in FIG. 5 to represent the bus 44, which, however, does not mean that there is only one bus or only one type of bus.

The memory 42 is configured to store executable program code, where the program code includes a computer operation instruction. The memory 42 may include a high-speed RAM memory, and may further include a nonvolatile memory (non-volatile memory), such as at least one disk memory.

The processor 41 may be a central processing unit (Central Processing Unit, CPU for short), or an application-specific integrated circuit (Application Specific Integrated Circuit, ASIC for short), or may be configured as one or more integrated circuits that implement this embodiment of the present invention.

The communications interface 43 is mainly configured to implement communication between apparatuses in this embodiment.

The processor 41 is configured to receive, by using the at least one communications interface 43, information that is about a time resource and/or a frequency resource obtained by contention by a base station eNB in an unlicensed spectrum and is sent by the base station.

The processor 41 is further configured to communicate with the base station eNB according to the information about the time resource and/or the frequency resource and by using the at least one communications interface 43.

According to the user equipment provided in this embodiment of the present invention, a base station eNB generates, by using a time resource and/or a frequency resource obtained by contending with another system using an unlicensed spectrum, information about the time resource and/or the frequency resource, and sends the information about the time resource and/or the frequency resource to the user equipment, so that the user equipment transmits data on a time resource and/or a frequency resource allocated by the base station eNB, thereby improving efficiency of using an unlicensed spectrum by the user equipment.

Optionally, the processor 41 is further configured to: before receiving, by using the at least one communications interface 43, the information that is about the time resource and/or the frequency resource obtained by contention by the base station eNB in the unlicensed spectrum and is sent by the base station, receive, by using the at least one communications interface 43, a parameter that is of the time resource and/or the frequency resource obtained by contention on the unlicensed spectrum resource and is allocated by the base station eNB, where the parameter includes at least an unlicensed spectrum radio network temporary identifier U-RNTI, and the U-RNTI is used to instruct the UE to detect a physical downlink control channel PDCCH.

Further, the information about the time resource and/or the frequency resource includes at least the parameter of the time resource and/or the frequency resource on the unlicensed spectrum resource.

Optionally, the information about the time resource and/or the frequency resource includes at least:

a start time and an end time of the time resource and/or the frequency resource; or the time resource and/or the frequency resource obtained by contention by the base station.

Optionally, the processor 41 is further configured to: when the base station eNB obtains by contention no time resource and/or no frequency resource, receive the information about the time resource and/or the frequency resource by using the at least one communications interface 43 to learn that the base station eNB obtains by contention no time resource and/or no frequency resource.

Optionally, the processor 41 is specifically configured to:

determine configuration information according to the information about the time resource and/or the frequency resource, where the UE performs at least the following operations to determine the configuration information according to the information about the time resource and/or the frequency resource:

calculating a valid time of the time resource and/or the frequency resource according to a start moment of received physical downlink control channel PDCCH scheduling signaling, or calculating a valid time of the time resource and/or the frequency resource according to a preset time; and/or detecting a primary synchronization signal PSS and/or a secondary synchronization signal SSS on the obtained time resource and/or frequency resource according to the time resource and/or the frequency resource; and/or determining a length of a DRX activation time according to a preset discontinuous reception DRX parameter and the received information about the time resource and/or the frequency resource; and/or determining, according to the preset discontinuous reception DRX parameter and the received information about the time resource and/or the frequency resource, an operation for a timer corresponding to DRX.

Further, the processor 41 is further specifically configured to:

when an end time of the time resource and/or the frequency resource in the received information about the time resource and/or the frequency resource arrives, or the DRX activation time determined according to the preset discontinuous reception DRX parameter and the received information about the time resource and/or the frequency resource expires, stop or suspend at least one timer corresponding to the DRX, where the timer corresponding to the DRX includes at least one of the following timers: an on-duration timer, a DRX activation time timer, a DRX retransmission timer, a DRX short cycle timer, or a DRX long cycle timer.

Further, optionally, the processor 41 is further specifically configured to:

when the UE receives information that is about a new time resource and/or a new frequency resource obtained by contention and that is notified by the eNB, start or restart at least one of the following stopped or suspended DRX-related timers: the on-duration timer, the DRX activation time timer, the DRX retransmission timer, the DRX short cycle timer, or the DRX long cycle timer at a start time location of the new time resource and/or the new frequency resource obtained by contention, or within a preset time, or at a start location of the DRX activation time determined according to the preset discontinuous reception DRX parameter and the received information about the time resource and/or the frequency resource.

Optionally, a start location of transmit timing of the PSS and/or the SSS starts from a start location of the time resource and/or the frequency resource obtained by contention.

Further, the processor 41 is further specifically configured to:

use the start location of the time resource and/or the frequency resource obtained by contention as a frame 0 and/or a subframe 0; or count, by following the last frame number and/or the last subframe number on a resource obtained by contention previous time, a frame number and a subframe number of the start location of the time resource and/or the frequency resource obtained by contention.

Optionally, the processor 41 is further specifically configured to:

transmit data according to the information about the time resource and/or the frequency resource and by observing at least one of the following principles:

when the UE transmits uplink data according to the information about the time resource and/or the frequency resource, a hybrid automatic repeat request-acknowledgment HARQ-ACK corresponding to uplink data transmission in the last N subframes indicated in the time resource and/or the frequency resource should be received on a carrier corresponding to a licensed spectrum, or on an anchor carrier, or on a carrier corresponding to another unlicensed spectrum in which downlink transmission can be performed, where N in "the last N subframes" is a positive integer; and/or when the UE receives downlink data according to the information about the time resource and/or the frequency resource, a hybrid automatic repeat request-acknowledgment HARQ-ACK corresponding to downlink data receiving in the last N subframes indicated in the time resource and/or the frequency resource should be transmitted on a carrier corresponding to a licensed spectrum, or on an anchor carrier, or on a carrier corresponding to another unlicensed spectrum in which uplink transmission can be performed, or the HARQ-ACK is received, within a preset time after being delayed, on a time resource and/or a frequency resource that are/is obtained by contention next time and are/is used for data transmission, where N in "the last N subframes" is a positive integer.

Optionally, the processor 41 is further specifically configured to:

receive, by using the at least one communications interface 43, corresponding physical downlink control channel PDCCH signaling sent by the base station eNB, where the PDCCH signaling is used to instruct the UE to obtain the information about the time resource and/or the frequency resource obtained by contention by the base station eNB; and obtain information about a corresponding time resource and/or frequency resource according to the PDCCH signaling.

Optionally, the processor 41 is further specifically configured to:

determine a time pattern for listening on a PDCCH channel in an unlicensed cell; and listen to, according to the determined time pattern, PDCCH signaling sent by the base station eNB in the unlicensed cell, where the PDCCH signaling includes the information about the time resource and/or the frequency resource obtained by contention by the eNB in the unlicensed spectrum.

Further, the processor 41 is further specifically configured to:

determine, according to a time pattern parameter value preset in a system, a time for listening to the PDCCH signaling in the unlicensed cell; or receive, by using the at least one communications interface 43, a time pattern parameter configuration message sent by the eNB, where the time pattern configuration message includes a time pattern parameter that is for listening to the PDCCH signaling in the unlicensed cell and that is allocated by the eNB to the UE.

Optionally, the information about the time resource and/or the frequency resource further includes at least:

a time resource and/or a frequency resource on which the UE performs uplink transmission and/or downlink transmission; and/or a time division duplex TDD configuration used by the UE on the time resource and/or the frequency resource.

Further, in the information about the time division duplex TDD configuration used by the UE on the time resource and/or the frequency resource, a start location of a start frame and/or a start subframe of the TDD configuration starts from a start location of the time resource and/or the frequency resource obtained by contention by the base station eNB.

According to the user equipment provided in this embodiment of the present invention, a base station eNB generates, by using a time resource and/or a frequency resource obtained by contending with another system using an unlicensed spectrum, information about the time resource and/or the frequency resource, and sends the information about the time resource and/or the frequency resource to the user equipment, so that the user equipment transmits data on a time resource and/or a frequency resource allocated by the base station eNB, thereby improving efficiency of using an unlicensed spectrum by the user equipment. In addition, by means of sending PDCCH scheduling signaling, a timer inside the user equipment can be adjusted and controlled, thereby reducing power consumption of the user equipment.

Figure 6:
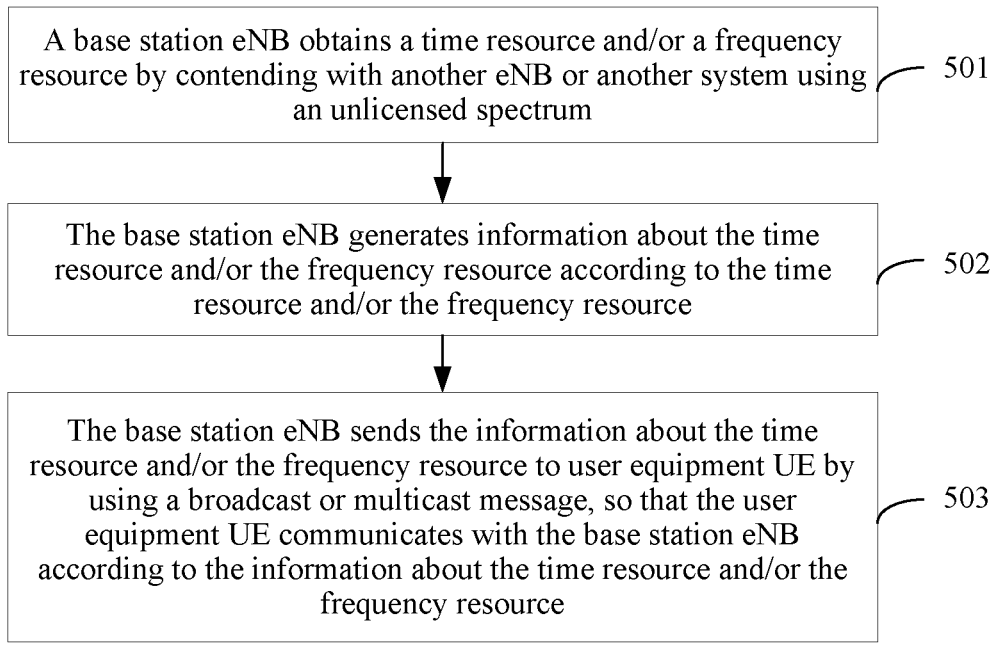
FIG. 6 is a schematic flowchart of a method for performing communication by using an unlicensed spectrum according to an embodiment of the present invention.

An embodiment of the present invention provides a method for performing communication by using an unlicensed spectrum executed on a base station side. Referring to FIG. 6, the method specifically includes the following steps:

501. A base station eNB obtains a time resource and/or a frequency resource by contending with another eNB or another system using an unlicensed spectrum.

502. The base station eNB generates information about the time resource and/or the frequency resource according to the time resource and/or the frequency resource.

Optionally, before the base station eNB generates the information about the time resource and/or the frequency resource according to the time resource and/or the frequency resource, the base station eNB allocates, to user equipment UE (User Equipment), a parameter for obtaining the information about the time resource and/or the frequency resource on the unlicensed spectrum resource, where the parameter of the information about the time resource and/or the frequency resource includes at least an unlicensed spectrum radio network temporary identifier U-RNTI (Unlicensed-Radio Network Temporary Identity), the U-RNTI is a resource identifier RNTI that can be used by at least one group of user equipment UE in an unlicensed cell, and the RNTI is used for detecting a physical downlink control channel PDCCH (Physical Downlink Control Channel).

The information about the time resource and/or the frequency resource further includes at least:

a time resource and/or a frequency resource on which the UE can perform uplink transmission and/or downlink transmission;

and/or information about a time division duplex TDD configuration used by the UE on the time resource and/or the frequency resource.

In the information about the time division duplex TDD configuration used by the UE on the time resource and/or the frequency resource, a start subframe of the TDD configuration starts from a start location of the time resource and/or the frequency resource obtained by contention by the base station eNB. That is, when the UE applies the time division duplex TDD (Time Division Duplexing) configuration, a start location of TDD is the start location of the time resource and/or the frequency resource obtained by contention.

503. The base station eNB sends the information about the time resource and/or the frequency resource to user equipment UE by using a broadcast or multicast message, so that the user equipment UE communicates with the base station eNB according to the information about the time resource and/or the frequency resource.

The information about the time resource and/or the frequency resource includes at least:

a start time and an end time of the time resource and/or the frequency resource, where if time resource information and/or frequency resource information repeatedly broadcast or multicast herein are/is the same, the time resource information and/or the frequency resource information indicate/indicates a start time and an end time of a time resource and/or a frequency resource for the UE within a time resource period and/or a frequency resource period; or the time resource and/or the frequency resource obtained by contention by the base station, where the time resource and/or the frequency resource obtained by contention by the base station may be a remaining part of a segment of resource, and if resource messages repeatedly broadcast or multicast herein are different, resource information broadcast or multicast each time actually indicates a remaining resource in a current time resource and/or a current frequency resource obtained by contention.

Optionally, when the base station eNB obtains by contention no time resource and/or no frequency resource, the base station eNB sends the information about the time resource and/or the frequency resource to notify the UE that no time resource and/or no frequency resource are/is obtained by contention.

When the information about the time resource and/or the frequency resource includes a time resource and/or a frequency resource not obtained by contention by the eNB within a specific time range, the UE learns an obtained time resource and/or frequency resource according to the unobtained time resource and/or frequency resource in the information about the time resource and/or the frequency resource.

Optionally, the resource broadcast/multicast message is at least one of a Radio Resource Control RRC (Radio Resource Control) message, a Media Access Control control element MAC CE (Media Access Control Control Element) message, or physical downlink control channel PDCCH (Physical Downlink Control Channel) signaling.

The resource broadcast/multicast message is repeatedly sent within a valid time of a resource obtained by contention.

If the base station eNB obtains by contention more time resources and/or frequency resources on a current valid resource, the base station eNB may repeat the resource broadcast/multicast message by a preset quantity N of times, and then update, according to the more time resources and/or frequency resources obtained by contention, the information that is about the time resource and/or the frequency resource obtained by contention and is included in the resource broadcast/multicast message, and continue repeatedly sending the resource broadcast/multicast message.

Figure 7:
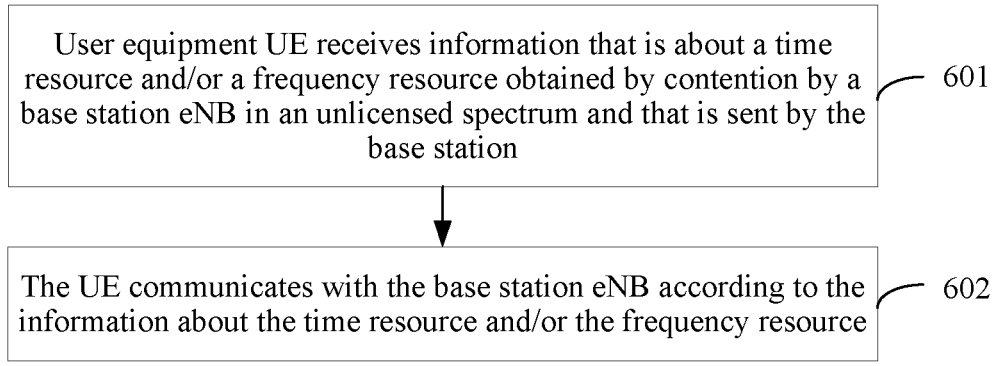
FIG. 7 is a schematic flowchart of another method for performing communication by using an unlicensed spectrum according to an embodiment of the present invention.

An embodiment of the present invention provides a method for performing communication by using an unlicensed spectrum executed on a user equipment side. Referring to FIG. 7, the method specifically includes the following steps:

601. User equipment UE receives information that is about a time resource and/or a frequency resource obtained by contention by a base station eNB in an unlicensed spectrum and that is sent by the base station.

Herein, before the user equipment UE receives the information that is about the time resource and/or the frequency resource and that is sent by the base station eNB, the UE receives a parameter that is of the information about the time resource and/or the frequency resource on the unlicensed spectrum resource and that is allocated by the base station eNB, where the parameter of the information about the time resource and/or the frequency resource includes at least an unlicensed spectrum radio network temporary identifier U-RNTI, the U-RNTI is a resource identifier RNTI that can be used by at least one group of user equipment UE in an unlicensed cell, and the RNTI is used for detecting a physical downlink control channel PDCCH.

Further, the UE receives corresponding physical downlink control channel PDCCH signaling sent by the base station eNB, where the PDCCH signaling is used to instruct the UE to obtain the information about the time resource and/or the frequency resource obtained by contention by the base station eNB; and obtains information about a corresponding time resource and/or frequency resource according to the PDCCH signaling.

Herein, the UE receives the corresponding physical downlink control channel PDCCH (Physical Downlink Control Channel) scheduling signaling sent by the eNB, where the PDCCH scheduling signaling includes information about a time resource and/or a frequency resource used for transmitting uplink data and/or downlink data by the UE, and the PDCCH scheduling signaling may be sent in an unlicensed cell U-Cell (Unlicensed Cell), or may be sent in a licensed cell L-Cell (licensed Cell).

Optionally, the receiving, by user equipment UE, information that is about a time resource and/or a frequency resource obtained by contention by a base station eNB in an unlicensed spectrum and that is sent by the base station further includes:

a. determining a time pattern for listening on a PDCCH channel in an unlicensed cell, where the UE determines, according to a time pattern parameter value preset in a system, a time for listening to the PDCCH signaling in the unlicensed cell, or the UE receives a time pattern parameter configuration message sent by the eNB, where the time pattern configuration message includes a time pattern parameter that is for listening to the PDCCH signaling in the unlicensed cell and that is allocated by the eNB to the UE; and b. listening to, by the UE according to the determined time pattern, the PDCCH signaling sent by the base station eNB in the unlicensed cell.

The PDCCH signaling includes the information about the time resource and/or the frequency resource obtained by contention by the eNB in the unlicensed spectrum.

602. The UE communicates with the base station eNB according to the information about the time resource and/or the frequency resource.

Optionally, the UE transmits data according to the information about the time resource and/or the frequency resource and by observing at least one of the following principles:

when the UE transmits uplink data according to the information about the time resource and/or the frequency resource, a hybrid automatic repeat request-acknowledgment HARQ-ACK corresponding to uplink data transmission in the last N subframes indicated in the time resource and/or the frequency resource should be received on a carrier corresponding to a licensed spectrum, or on an anchor carrier, or on a carrier corresponding to another unlicensed spectrum in which downlink transmission can be performed, where N in "the last N subframes" is a positive integer; and/or when the UE receives downlink data according to the information about the time resource and/or the frequency resource, a hybrid automatic repeat request-acknowledgment HARQ-ACK corresponding to downlink data receiving in the last N subframes indicated in the time resource and/or the frequency resource should be transmitted on a carrier corresponding to a licensed spectrum, or on an anchor carrier, or on a carrier corresponding to another unlicensed spectrum in which uplink transmission can be performed, or the HARQ-ACK is received, within a preset time after being delayed, on a time resource and/or a frequency resource that are/is obtained by contention next time and are/is used for data transmission, where N in "the last N subframes" is a positive integer.

Further, optionally, the UE performs at least the following operation to obtain the information about the time resource and/or the frequency resource:

receiving, by the UE, the parameter that is of the time resource and/or the frequency resource obtained by contention on the unlicensed spectrum resource and that is allocated by the base station eNB, where the parameter includes at least the unlicensed spectrum radio network temporary identifier U-RNTI, and the RNTI is used to instruct the UE to detect the physical downlink control channel PDCCH.

The UE determines configuration information according to the information about the time resource and/or the frequency resource, where the UE performs at least the following operations to determine the configuration information:

calculating a valid time of the time resource and/or the frequency resource according to a start moment of received physical downlink control channel PDCCH scheduling signaling, or calculating a valid time of the time resource and/or the frequency resource according to a preset time; and/or detecting a primary synchronization signal PSS and/or a secondary synchronization signal SSS on the obtained time resource and/or frequency resource according to the time resource and/or the frequency resource; and/or determining a length of a DRX activation time according to a preset discontinuous reception DRX parameter and the received information about the time resource and/or the frequency resource; and/or determining, according to the preset discontinuous reception DRX parameter and the received information about the time resource and/or the frequency resource, an operation for a timer corresponding to DRX.

When an end time of the time resource and/or the frequency resource in the received information about the time resource and/or the frequency resource arrives, or the DRX activation time determined according to the preset discontinuous reception DRX parameter and the received information about the time resource and/or the frequency resource expires, the UE stops or suspends at least one timer corresponding to the DRX, where the timer corresponding to the DRX includes at least one or two of an on-duration timer, a DRX activation time timer, a DRX retransmission timer, a DRX short cycle timer, or a DRX long cycle timer.

In addition, when the UE receives information that is about a new time resource and/or a new frequency resource obtained by contention and that is notified by the eNB, the UE starts or restarts at least one of the following stopped or suspended DRX-related timers: the on-duration timer, the DRX activation time timer, the DRX retransmission timer, the DRX short cycle timer, or the DRX long cycle timer at a start time location of the new time resource and/or the new frequency resource obtained by contention, or within a preset time, or at a start location of the DRX activation time determined according to the preset discontinuous reception DRX parameter and the received information about the time resource and/or the frequency resource.

According to the method for performing communication by using an unlicensed spectrum provided in this embodiment of the present invention, a base station eNB generates, by using a time resource and/or a frequency resource obtained by contending with another system using an unlicensed spectrum, information about the time resource and/or the frequency resource, and sends the information about the time resource and/or the frequency resource to user equipment, so that the user equipment transmits data on a time resource and/or a frequency resource allocated by the base station eNB, thereby improving efficiency of using an unlicensed spectrum by the user equipment.

Specifically, the following is described with reference to specific embodiments.

Embodiment 1

Figure 8:
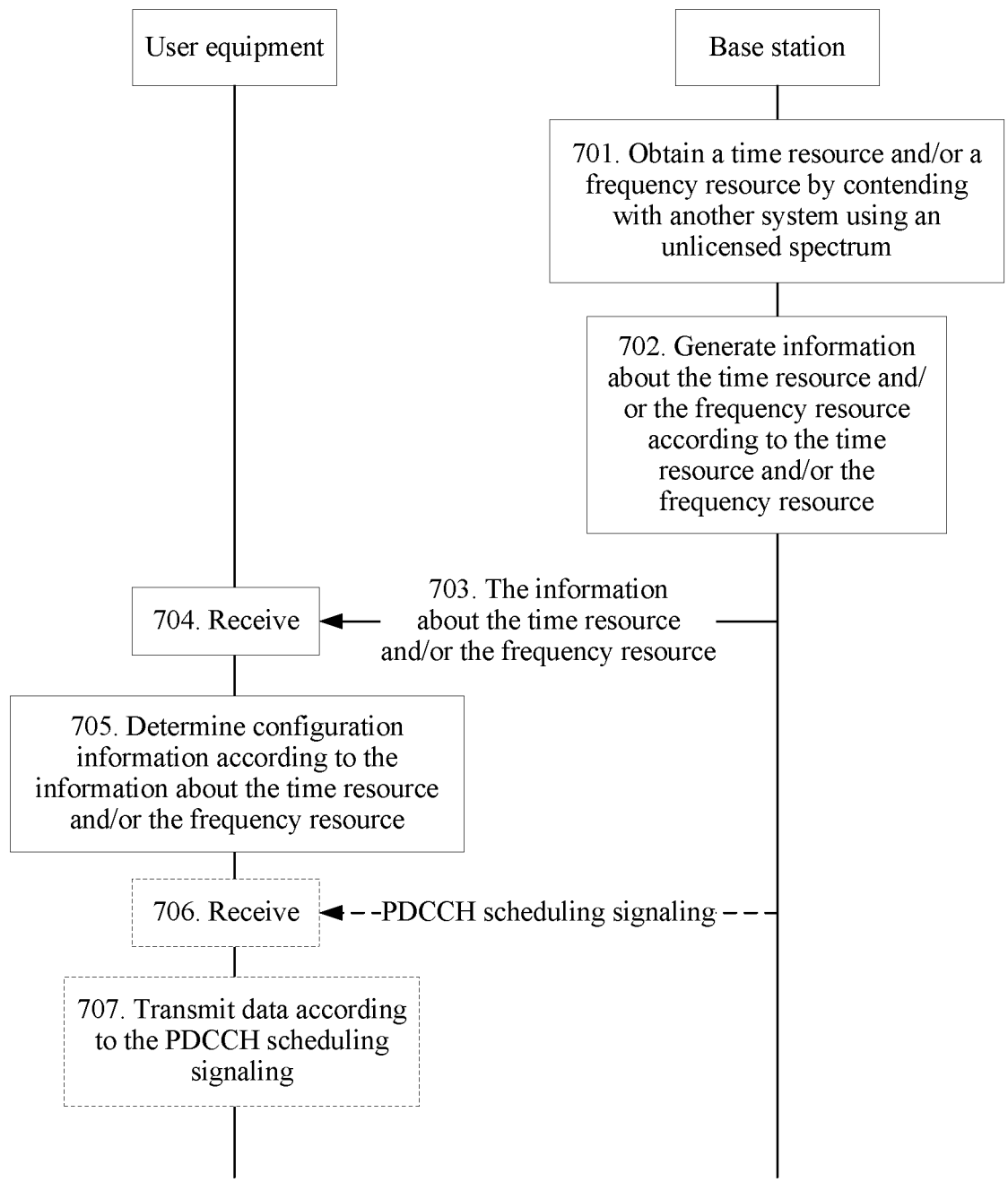
FIG. 8 is a schematic flowchart of a method for performing communication by using an unlicensed spectrum according to another embodiment of the present invention.

On a basis of the embodiment shown in FIG. 6 or FIG. 7, referring to FIG. 8, an embodiment of the present invention provides a method for performing communication by using an unlicensed spectrum. FIG. 8 shows a process in which a base station eNB generates, by using a time resource and/or a frequency resource obtained by contending with another system using an unlicensed spectrum, information about the time resource and/or the frequency resource, and sends the information about the time resource and/or the frequency resource to user equipment, and specific steps are as follows:

701. A base station eNB obtains a time resource and/or a frequency resource by contending with another eNB or another system using an unlicensed spectrum.

702. The base station eNB generates information about the time resource and/or the frequency resource according to the time resource and/or the frequency resource.

Optionally, before the base station eNB generates the information about the time resource and/or the frequency resource according to the time resource and/or the frequency resource, the base station eNB allocates, to user equipment UE (User Equipment), a parameter for obtaining the information about the time resource and/or the frequency resource on the unlicensed spectrum resource, where the parameter of the information about the time resource and/or the frequency resource includes at least an unlicensed spectrum radio network temporary identifier U-RNTI (Unlicensed-Radio Network Temporary Identity), the U-RNTI is a resource identifier RNTI that can be used by at least one group of user equipment UE in an unlicensed cell, and the RNTI is used for detecting a physical downlink control channel PDCCH (Physical Downlink Control Channel).

The base station eNB herein may be a Long Term Evolution eNodeB LTE-eNB (Long Term Evolution-eNB), which is subject to implementation of the method for performing communication by using an unlicensed spectrum provided in this embodiment of the present invention, and is not specifically limited.

The information about the time resource and/or the frequency resource further includes at least:

a time resource and/or a frequency resource on which the UE can perform uplink transmission and/or downlink transmission; and/or information about a time division duplex TDD configuration used by the UE on the time resource and/or the frequency resource.

In the information about the time division duplex TDD configuration used by the UE on the time resource and/or the frequency resource, a start subframe of the TDD configuration starts from a start location of the time resource and/or the frequency resource obtained by contention by the base station eNB. That is, when the UE applies the time division duplex TDD (Time Division Duplexing) configuration, a start location of TDD is the start location of the time resource and/or the frequency resource obtained by contention.

703. The base station eNB sends the information about the time resource and/or the frequency resource to user equipment UE by using a broadcast or multicast message, so that the user equipment UE communicates with the base station eNB according to the information about the time resource and/or the frequency resource.

The sent information about the time resource and/or the frequency resource includes at least:

a start time and an end time of the information about the time resource and/or the frequency resource, where if time resource information and/or frequency resource information repeatedly broadcast or multicast herein are/is the same, the time resource information and/or the frequency resource information indicate/indicates a start time and an end time of a time resource and/or a frequency resource for the UE within a time resource period and/or a frequency resource period; or a remaining resource in the time resource and/or the frequency resource obtained by contention by the base station, where if resource messages repeatedly broadcast or multicast herein are different, resource information broadcast or multicast each time actually indicates a remaining resource in a current time resource and/or a current frequency resource obtained by contention, and the time resource and/or the frequency resource obtained by contention by the base station may be a remaining part of a segment of resource.

Optionally, when the base station eNB obtains by contention no time resource and/or no frequency resource, the base station eNB sends the information about the time resource and/or the frequency resource to notify the UE that no time resource and/or no frequency resource are/is obtained by contention.

When the information about the time resource and/or the frequency resource includes a time resource and/or a frequency resource not obtained by contention by the eNB within a specific time range, the UE learns an obtained time resource and/or frequency resource according to the unobtained time resource and/or frequency resource in the information about the time resource and/or the frequency resource.

Optionally, the resource broadcast/multicast message is at least one of a Radio Resource Control RRC (Radio Resource Control) message, a Media Access Control control element MAC CE (Media Access Control Control Element) message, or physical downlink control channel PDCCH (Physical Downlink Control Channel) signaling.

The resource broadcast/multicast message is repeatedly sent within a valid time of a resource obtained by contention.

If the base station eNB obtains by contention more time resources and/or frequency resources on a current valid resource, the base station eNB may repeat the resource broadcast/multicast message by a preset quantity N of times, and then update, according to the more time resources and/or frequency resources obtained by contention, the information that is about the time resource and/or the frequency resource obtained by contention and is included in the resource broadcast/multicast message, and continue repeatedly sending the resource broadcast/multicast message.

Optionally, the sending, by the base station eNB, the information about the time resource and/or the frequency resource to user equipment UE by using a broadcast or multicast message includes:

notifying, on a physical downlink control channel PDCCH of the unlicensed spectrum, the UE using an unlicensed spectrum of the information about the time resource and/or the frequency resource obtained by contention; or sending the information about the time resource and/or the frequency resource obtained by contention to all user equipment or a group of user equipment by using common search space CSS (Common Search Space) of a physical downlink control channel PDCCH; or sending the information about the time resource and/or the frequency resource obtained by contention to at least one user equipment by using user equipment UE search space USS (UE Search Space) of a physical downlink control channel PDCCH.

704. The user equipment UE receives the information that is about the time resource and/or the frequency resource obtained by contention by the base station eNB in the unlicensed spectrum and that is sent by the base station.

Herein, before the user equipment UE receives the information that is about the time resource and/or the frequency resource and that is sent by the base station eNB, the UE receives the parameter that is of the information about the time resource and/or the frequency resource on the unlicensed spectrum resource and that is allocated by the base station eNB, where the parameter of the time resource and/or the frequency resource includes at least the unlicensed spectrum radio network temporary identifier U-RNTI (Unlicensed-Radio Network Temporary Identity), the U-RNTI is a resource identifier RNTI that can be used by at least one group of user equipment UE in the unlicensed cell, and the RNTI is used for detecting the physical downlink control channel PDCCH (Physical Downlink Control Channel).

705. The UE determines configuration information according to the information about the time resource and/or the frequency resource.

Herein, that the UE determines configuration information according to the information about the time resource and/or the frequency resource is specifically as follows:

the UE performs at least the following operations to obtain the information about the time resource and/or the frequency resource:

calculating a valid time of the time resource and/or the frequency resource according to a start moment of received physical downlink control channel PDCCH scheduling signaling, or calculating a valid time of the time resource and/or the frequency resource according to a preset time; and/or detecting a primary synchronization signal PSS and/or a secondary synchronization signal SSS on the obtained time resource and/or frequency resource according to the time resource and/or the frequency resource, where sending of the primary synchronization signal PSS and/or the secondary synchronization signal SSS specifically starts from a start location, where a current start location may be used as a frame 0 or a subframe 0, or a frame number and a subframe number follow a frame number or a subframe number existing when a time resource and/or a frequency resource obtained by contention previous time are/is used up; and/or determining a length of a DRX activation time according to a preset discontinuous reception DRX parameter and the received information about the time resource and/or the frequency resource, where specifically herein, after determining an activation time for the UE within a DRX period according to the discontinuous reception DRX (Discontinuous Reception) configuration parameter and a PDCCH new data indicator, the UE needs to obtain an intersection set according to a time length of the time resource and/or the frequency resource in the information that is about the time resource and/or the frequency resource and that is sent by the eNB, and then determines an actual length of the activation time, where the UE specifically determines, according to the preset DRX parameter and updated time resource information and/or frequency resource information transmitted through the PDCCH, a DRX activation time currently required by the UE, and then compares, by receiving the information that is about the time resource and/or the frequency resource and that is sent by the eNB, the DRX activation time required by the UE with the time length of the time resource and/or the frequency resource obtained by contention, and obtains an intersection set of the time resource and/or the frequency resource and the DRX activation time currently required by the UE, so as to obtain the actual length of the activation time; and/or determining, according to the preset discontinuous reception DRX parameter and the received information about the time resource and/or the frequency resource, an operation for a timer corresponding to DRX.

When an end time of the time resource and/or the frequency resource in the received information about the time resource and/or the frequency resource arrives, or the DRX activation time determined according to the preset discontinuous reception DRX parameter and the received information about the time resource and/or the frequency resource expires, at least one timer corresponding to the DRX is stopped or suspended, where the timer corresponding to the DRX includes at least one or two of an on-duration timer, a DRX activation time timer, a DRX retransmission timer, a DRX short cycle timer, or a DRX long cycle timer.

Herein, the UE transmits data according to the information about the time resource and/or the frequency resource and by observing at least one of the following principles:

when the UE transmits uplink data according to the information about the time resource and/or the frequency resource, a hybrid automatic repeat request-acknowledgment HARQ-ACK corresponding to uplink data transmission in the last N subframes indicated in the time resource and/or the frequency resource should be received on a carrier corresponding to a licensed spectrum, or on an anchor carrier, or on a carrier corresponding to another unlicensed spectrum in which downlink transmission can be performed, where N in "the last N subframes" is a positive integer; and/or when the UE receives downlink data according to the information about the time resource and/or the frequency resource, a hybrid automatic repeat request-acknowledgment HARQ-ACK corresponding to downlink data receiving in the last N subframes indicated in the time resource and/or the frequency resource should be transmitted on a carrier corresponding to a licensed spectrum, or on an anchor carrier, or on a carrier corresponding to another unlicensed spectrum in which uplink transmission can be performed, or the HARQ-ACK is received, within a preset time after being delayed, on a time resource and/or a frequency resource that are/is obtained by contention next time and are/is used for data transmission, where N in "the last N subframes" is a positive integer.

Herein, when the base station particularly sends dedicated PDCCH scheduling signaling to the UE, the base station correspondingly sends the physical downlink control channel PDCCH scheduling signaling to at least one user equipment, so that the at least one user equipment obtains information about a corresponding time resource and/or frequency resource according to the PDCCH scheduling signaling.

706. The UE receives corresponding physical downlink control channel PDCCH signaling sent by the base station eNB.

The PDCCH signaling is used to instruct the UE to obtain the information about the time resource and/or the frequency resource obtained by contention by the base station eNB.

707. The UE obtains information about a corresponding time resource and/or frequency resource according to the PDCCH signaling.

Herein, the UE receives the corresponding physical downlink control channel PDCCH (Physical Downlink Control Channel) scheduling signaling sent by the eNB, where the PDCCH scheduling signaling includes information about a time resource and/or a frequency resource used for transmitting uplink data and/or downlink data by the UE, and the PDCCH scheduling signaling may be sent in an unlicensed cell U-Cell (Unlicensed Cell), or may be sent in a licensed cell L-Cell (licensed Cell).

According to the method for performing communication by using an unlicensed spectrum provided in this embodiment of the present invention, a base station eNB generates, by using a time resource and/or a frequency resource obtained by contending with another system using an unlicensed spectrum, information about the time resource and/or the frequency resource, and sends the information about the time resource and/or the frequency resource to user equipment, so that the user equipment transmits data on a time resource and/or a frequency resource allocated by the base station eNB, thereby improving efficiency of using an unlicensed spectrum by the user equipment. When the user equipment correspondingly adjusts an internal DRX-related timer according to the information about the time resource and/or the frequency resource, a situation in which the user equipment blindly performs local timing is avoided, thereby reducing internal power consumption of the user equipment.

Embodiment 2

Figure 9:
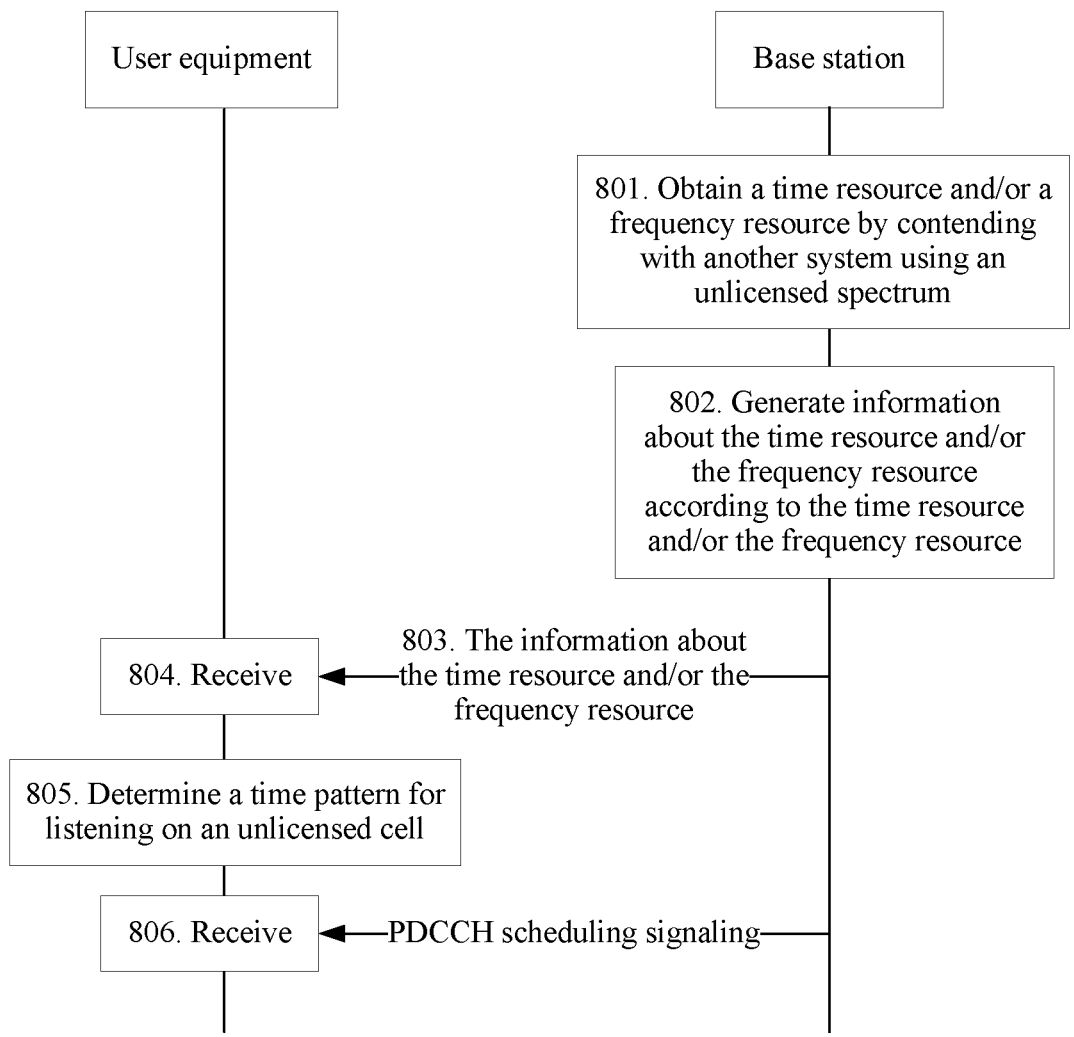
FIG. 9 is a schematic flowchart of a method for performing communication by using an unlicensed spectrum according to still another embodiment of the present invention.

On a basis of the embodiment shown in FIG. 6 or FIG. 7, referring to FIG. 9, an embodiment of the present invention provides a method for performing communication by using an unlicensed spectrum. FIG. 9 shows a process in which a base station eNB sends, by using a time resource and/or a frequency resource obtained by contending with another system using an unlicensed spectrum, a time required by user equipment UE for listening on a physical downlink control channel PDCCH to the user equipment UE in a form of information about the time resource and/or the frequency resource, and specific steps are as follows:

801. A base station eNB obtains a time resource and/or a frequency resource by contending with another eNB or another system using an unlicensed spectrum.

802. The base station eNB generates information about the time resource and/or the frequency resource according to the time resource and/or the frequency resource.

Optionally, before the base station eNB generates the information about the time resource and/or the frequency resource according to the time resource and/or the frequency resource, the base station eNB allocates, to user equipment UE (User Equipment), a parameter for obtaining the information about the time resource and/or the frequency resource on the unlicensed spectrum resource, where the parameter of the information about the time resource and/or the frequency resource includes at least an unlicensed spectrum radio network temporary identifier U-RNTI (Unlicensed-Radio Network Temporary Identity), the U-RNTI is a resource identifier RNTI that can be used by at least one group of user equipment UE in an unlicensed cell, and the RNTI is used for detecting a physical downlink control channel PDCCH (Physical Downlink Control Channel).

The base station eNB herein may be a Long Term Evolution eNodeB LTE-eNB (Long Term Evolution-eNB), which is subject to implementation of the method for performing communication by using an unlicensed spectrum provided in this embodiment of the present invention, and is not specifically limited.

The information about the time resource and/or the frequency resource further includes at least:

a time resource and/or a frequency resource on which the UE can perform uplink transmission and/or downlink transmission; and/or information about a time division duplex TDD configuration used by the UE on the time resource and/or the frequency resource.

In the time division duplex TDD configuration used by the UE on the time resource and/or the frequency resource, a start subframe of the TDD configuration starts from a start location of the time resource and/or the frequency resource obtained by contention by the base station eNB. That is, when the UE applies the time division duplex TDD (Time Division Duplexing) configuration, a start location of TDD is the start location of the time resource and/or the frequency resource obtained by contention.

803. The base station eNB sends the information about the time resource and/or the frequency resource to user equipment UE by using a broadcast or multicast message, so that the user equipment UE communicates with the base station eNB according to the information about the time resource and/or the frequency resource.

The sent information about the time resource and/or the frequency resource includes at least:

a start time and an end time of the information about the time resource and/or the frequency resource, where if time resource information and/or frequency resource information repeatedly broadcast or multicast herein are/is the same, the time resource information and/or the frequency resource information indicate/indicates a start time and an end time of a time resource and/or a frequency resource for the UE within a time resource period and/or a frequency resource period; or the time resource and/or the frequency resource obtained by contention by the base station, where the time resource and/or the frequency resource obtained by contention by the base station may be a remaining part of a segment of resource, and if resource messages repeatedly broadcast or multicast herein are different, resource information broadcast or multicast each time actually indicates a remaining resource in a current time resource and/or a current frequency resource obtained by contention.

Optionally, when the base station eNB obtains by contention no time resource and/or no frequency resource, the base station eNB sends the information about the time resource and/or the frequency resource to notify the UE that no time resource and/or no frequency resource are/is obtained by contention.

When the information about the time resource and/or the frequency resource includes a time resource and/or a frequency resource not obtained by contention by the eNB within a specific time range, the UE learns an obtained time resource and/or frequency resource according to the unobtained time resource and/or frequency resource in the information about the time resource and/or the frequency resource.

Optionally, the resource broadcast/multicast message is at least one of a Radio Resource Control RRC (Radio Resource Control) message, a Media Access Control control element MAC CE (Media Access Control Control Element) message, or physical downlink control channel PDCCH (Physical Downlink Control Channel) signaling.

The resource broadcast/multicast message is repeatedly sent within a valid time of a resource obtained by contention.

If the base station eNB obtains by contention more time resources and/or frequency resources on a current valid resource, the base station eNB may repeat the resource broadcast/multicast message by a preset quantity N of times, and then update, according to the more time resources and/or frequency resources obtained by contention, the information that is about the time resource and/or the frequency resource obtained by contention and is included in the resource broadcast/multicast message, and continue repeatedly sending the resource broadcast/multicast message.

The base station eNB sends a time pattern parameter configuration message to the user equipment UE.

The time pattern configuration message herein includes a time pattern parameter that is for listening to PDCCH signaling in the unlicensed cell and that is allocated by the eNB to the UE, so that the UE determines, according to the parameter, a time pattern for listening to PDCCH signaling sent by the base station eNB in the unlicensed cell.

Herein, when obtaining by contention a time resource and/or a frequency resource, the base station eNB notifies, within a time for listening on the PDCCH in the unlicensed cell U-Cell the most recent time (that is, within a time of Y ms), the user equipment UE of information about the resource obtained by contention. Specifically, a time location at which the eNB sends the information about the resource obtained by contention within the time of Y ms is not fixed according to a location of a PDCCH resource obtained by contention by the eNB.

The time for listening on the PDCCH may be a preset period of X ms, and the user equipment UE is required to continuously listen on the PDCCH in the U-Cell for Y ms. Specifically, when the eNB allocates, to the UE, the information about the time resource and/or the frequency resource obtained by contention in the unlicensed spectrum, the eNB allocates the parameter of the information about the time resource and/or the frequency resource to the UE, that is, a value of the foregoing X and/or Y. For example, the eNB may instruct the UE to listen on the PDCCH in the U-Cell for 5 ms every other period of 50 ms. Herein, X is 50 ms, and Y is 5 ms, where X and Y are sent to the UE by using the information about the time resource and/or the frequency resource.

Optionally, the base station ENB notifies, on a physical downlink control channel PDCCH of the unlicensed spectrum, the UE using an unlicensed spectrum of the information about the time resource and/or the frequency resource obtained by contention; or the base station eNB sends the information about the time resource and/or the frequency resource obtained by contention to all or a group of user equipment UE by using common search space CSS (Common Search Space) of a physical downlink control channel PDCCH, where specifically, within a time of 5 ms, the base station eNB may send the information about the time resource and/or the frequency resource obtained by contention to UEs in all unlicensed cells U-Cells (Unlicensed Cell) by using the CSS of the physical downlink control channel PDCCH (Physical Downlink Control Channel), or allocate the time resource and/or the frequency resource obtained by contention to a corresponding UE by using USS of the PDCCH; or the base station eNB sends the information about the time resource and/or the frequency resource obtained by contention to at least one user equipment UE by using user equipment UE search space USS (UE Search Space) of a physical downlink control channel PDCCH.

804. The user equipment UE receives the information that is about the time resource and/or the frequency resource obtained by contention by the base station eNB in the unlicensed spectrum and that is sent by the base station.

805. The user equipment UE determines a time pattern for listening on a PDCCH channel in an unlicensed cell.

The UE determines, according to a time pattern parameter value preset in a system, a time for listening to the PDCCH signaling in the unlicensed cell; or the UE receives a time pattern parameter configuration message sent by the eNB, where the time pattern configuration message includes a time pattern parameter that is for listening to the PDCCH signaling in the unlicensed cell and that is allocated by the eNB to the UE.

806. The user equipment UE listens to, according to the determined time pattern, PDCCH signaling sent by the base station eNB in the unlicensed cell.

The PDCCH signaling includes the information about the time resource and/or the frequency resource obtained by contention by the eNB in the unlicensed spectrum.

Herein, after receiving the information that is about the time resource and/or the frequency resource and that is sent by the base station eNB, the user equipment UE obtains, according to the information about the time resource and/or the frequency resource, an indication time Y ms for listening on the PDCCH in the unlicensed cell U-Cell, and listens on the unlicensed cell according to the indication time.

Herein, the UE receives the corresponding physical downlink control channel PDCCH (Physical Downlink Control Channel) scheduling signaling sent by the eNB, where the PDCCH scheduling signaling includes information about a time resource and/or a frequency resource used for transmitting uplink data and/or downlink data by the UE, and the PDCCH scheduling signaling may be sent in an unlicensed cell U-Cell (Unlicensed Cell), or may be sent in a licensed cell L-Cell (licensed Cell).

Further, in the time division duplex TDD configuration used by the UE on the time resource and/or the frequency resource, a start location of a start frame and/or the start subframe of the TDD configuration start/starts from the start location of the time resource and/or the frequency resource obtained by contention by the base station eNB.

The start frame and/or the start subframe are/is determined as a frame 0 and/or a subframe 0; or a frame number and a subframe number of the start location of the time resource and/or the frequency resource obtained by contention are counted by following the last frame number and/or the last subframe number on a resource obtained by contention previous time.

According to the method for performing communication by using an unlicensed spectrum provided in this embodiment of the present invention, a base station eNB generates, by using a time resource and/or a frequency resource obtained by contending with another system using an unlicensed spectrum, information about the time resource and/or the frequency resource, and sends the information about the time resource and/or the frequency resource to user equipment, so that the user equipment transmits data on a time resource and/or a frequency resource allocated by the base station eNB, thereby improving efficiency of using an unlicensed spectrum by the user equipment. When the user equipment determines, according to the information about the time resource and/or the frequency resource, a time for listening on a PDCCH, a problem that the UE blindly listens on an unlicensed cell U-Cell is avoided, thereby reducing internal power consumption of the user equipment.

Figure 10:
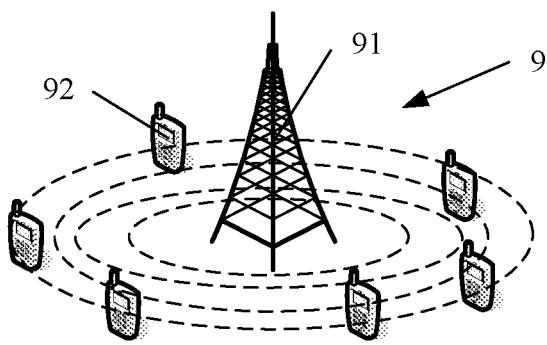
FIG. 10 is a schematic structural diagram of a communications system according to an embodiment of the present invention.

An embodiment of the present invention provides a communications system 9. Referring to FIG. 10, the communications system 9 includes a base station eNB 91 and at least one user equipment UE 92, where the base station eNB 91 is the base station eNB shown in FIG. 1 and FIG. 2; and the user equipment UE 92 is the user equipment UE shown in FIG. 3; or the base station eNB 91 is the base station eNB shown in FIG. 4; and the user equipment UE 92 is the user equipment UE shown in FIG. 5.

According to the communications system provided in this embodiment of the present invention, a base station eNB generates, by using a time resource and/or a frequency resource obtained by contending with another system using an unlicensed spectrum, information about the time resource and/or the frequency resource, and sends the information about the time resource and/or the frequency resource to user equipment, so that the user equipment transmits data on a time resource and/or a frequency resource allocated by the base station eNB, thereby improving efficiency of using an unlicensed spectrum by the user equipment.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. User equipment in communication with a base station (eNB), comprising:
   a memory;
   a data bus connected to the memory;
   at least one communications interface separately connected to the memory; and
   a processor, separately connected to the at least one communications interface, configured to:
      receive, by using the at least one communications interface, information about a time resource and/or a frequency resource obtained by contention by the base station (eNB) in an unlicensed spectrum and is sent by the base station,
      determine configuration information according to the information about the time resource and/or the frequency resource, by
         determining a length of a discontinuous reception (DRX) activation time according to a preset DRX parameter and the received information about the time resource and/or the frequency resource; and/or
         determining, according to the preset DRX parameter and the received information about the time resource and/or the frequency resource, an operation for a timer corresponding to DRX, and
      communicate with the base station eNB via the at least one communications interface, according to the configuration information determined according to the information about the time resource and/or the frequency resource,
   wherein the processor is further configured to obtain an actual length of an activation time by comparing a required DRX activation time with a time length of the time resource and/or the frequency resource.

2. The user equipment according to claim 1, wherein the processor is further configured to: when an end time of the time resource and/or the frequency resource in the received information about the time resource and/or the frequency resource arrives, or the DRX activation time determined according to the preset discontinuous reception DRX parameter and the received information about the time resource and/or the frequency resource expires, stop or suspend at least one timer corresponding to the DRX, wherein the timer corresponding to the DRX comprises at least one of the following timers: an on-duration timer, a DRX activation time timer, a DRX retransmission timer, a DRX short cycle timer, or a DRX long cycle timer.

3. The user equipment according to claim 1, wherein the processor is further configured to: when the UE receives information that is about a new time resource and/or a new frequency resource obtained by contention and that is notified by the eNB, start or restart at least one of the following stopped or suspended DRX-related timers: the on-duration timer, the DRX activation time timer, the DRX retransmission timer, the DRX short cycle timer, or the DRX long cycle timer at a start time location of the new time resource and/or the new frequency resource obtained by contention, or within a preset time, or at a start location of the DRX activation time determined according to the preset discontinuous reception DRX parameter and the received information about the time resource and/or the frequency resource.

4. The user equipment according to claim 1, wherein a start location of transmit timing of the PSS and/or the SSS starts from a start location of the time resource and/or the frequency resource obtained by contention.

5. The user equipment according to claim 4, wherein the processor is further configured to:
   use the start location of the time resource and/or the frequency resource obtained by contention as a frame 0 and/or a subframe 0; or
   count, by following the last frame number and/or the last subframe number on a resource obtained by contention previous time, a frame number and a subframe number of the start location of the time resource and/or the frequency resource obtained by contention.

6. The user equipment according to claim 1, wherein the information about a time resource and/or a frequency resource includes at least one Unlicensed-Radio Network Temporary Identity (U-RNTI), and the U-RNTI is used to detect for detecting a physical downlink control channel (PDCCH).

7. A method for performing communication by using an unlicensed spectrum, comprising:
   receiving, by user equipment (UE), information that is about a time resource and/or a frequency resource obtained by contention by a base station in an unlicensed spectrum and that is sent by the base station; and
   communicating, by the UE, with the base station according to the information about the time resource and/or the frequency resource, after determining, by the UE, configuration information according to the information about the time resource and/or the frequency resource, by
      calculating a valid time of the time resource and/or the frequency resource according to a start moment of received physical downlink control channel (PDCCH) scheduling signaling, or calculating a valid time of the time resource and/or the frequency resource according to a preset time; and/or detecting a primary synchronization signal (PSS) and/or a secondary synchronization signal (SSS) on the obtained time resource and/or frequency resource according to the time resource and/or the frequency resource; and/or determining a length of a discontinuous reception (DRX) activation time according to a preset DRX parameter and the received information about the time resource and/or the frequency resource; and/or determining, according to the preset DRX parameter and the received information about the time resource and/or the frequency resource, an operation for a timer corresponding to DRX, wherein an actual length of an activation time is obtained by comparing a required DRX activation time with a time length of the time resource and/or the frequency resource.

8. The method according to claim 7, wherein the determining, according to the preset DRX parameter and the received information about the time resource and/or the frequency resource, an operation for a timer corresponding to DRX comprises:

when an end time of the time resource and/or the frequency resource in the received information about the time resource and/or the frequency resource arrives, or the DRX activation time determined according to the preset discontinuous reception DRX parameter and the received information about the time resource and/or the frequency resource expires, stopping or suspending, by the UE, at least one timer corresponding to the DRX, wherein the timer corresponding to the DRX comprises at least one of the following timers: an on-duration timer, a DRX activation time timer, a DRX retransmission timer, a DRX short cycle timer, or a DRX long cycle timer.

9. The method according to claim 7, wherein the information about a time resource and/or a frequency resource includes at least one Unlicensed-Radio Network Temporary Identity (U-RNTI), and the U-RNTI is used to detect for detecting a physical downlink control channel (PDCCH).

* * * * *